(12) United States Patent
Sato et al.

(10) Patent No.: US 6,903,900 B2
(45) Date of Patent: Jun. 7, 2005

(54) PERPENDICULAR MAGNETIC RECORDING HEAD INCLUDING NONMAGNETIC LAYER OVERLAYING MAIN POLE LAYER

(75) Inventors: Kiyoshi Sato, Niigata-ken (JP); Kiyoshi Kobayashi, Niigata-ken (JP); Hisayuki Yazawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 342 days.

(21) Appl. No.: 10/025,143

(22) Filed: Dec. 18, 2001

(65) Prior Publication Data

US 2002/0080525 A1 Jun. 27, 2002

(30) Foreign Application Priority Data

Dec. 26, 2003 (JP) .................................... 2000-394723

(51) Int. Cl.[7] .................................................. G11B 5/39
(52) U.S. Cl. ...................................................... 360/126
(58) Field of Search .............................. 360/126, 119, 360/123

(56) References Cited

U.S. PATENT DOCUMENTS

| | | | | |
|---|---|---|---|---|
| 4,438,471 A | * | 3/1984 | Oshiki et al. ................ 360/125 |
| 4,546,398 A | | 10/1985 | Toda et al. |
| 4,636,897 A | | 1/1987 | Nakamura et al. |
| 4,873,599 A | | 10/1989 | Sueoka |
| 4,899,434 A | * | 2/1990 | Roberts .................... 29/603.12 |
| 4,974,110 A | * | 11/1990 | Kanamine et al. ........... 360/126 |
| 5,027,246 A | * | 6/1991 | Numazawa et al. ......... 360/126 |
| 5,075,280 A | * | 12/1991 | Pisharody et al. ........... 505/171 |
| 5,408,373 A | * | 4/1995 | Bajorek et al. ........... 360/244.3 |
| 5,649,351 A | * | 7/1997 | Cole et al. ................ 29/603.14 |
| 6,226,149 B1 | * | 5/2001 | Dill et al. .................... 360/126 |
| 6,513,228 B1 | * | 2/2003 | Khizroev et al. ......... 29/603.14 |
| 6,687,084 B2 | * | 2/2004 | Takahashi et al. ........... 360/126 |
| 6,697,221 B2 | * | 2/2004 | Sato et al. .................... 360/126 |
| 2002/0006013 A1 | * | 1/2002 | Sato et al. .................... 360/126 |

FOREIGN PATENT DOCUMENTS

| | | |
|---|---|---|
| JP | 63-195815 | 8/1988 |
| JP | 07-262519 | 10/1995 |
| JP | 8-106613 | 4/1996 |
| JP | 08-106613 | 4/1996 |
| JP | 10-320720 | 12/1998 |
| JP | 2000-099916 | 4/2000 |
| JP | 2000-394723 | 5/2004 |

* cited by examiner

Primary Examiner—Brian E. Miller
(74) Attorney, Agent, or Firm—Brinks Hofer Gilson & Lione

(57) ABSTRACT

A perpendicular magnetic recording head includes: an auxiliary pole layer; a main pole layer; a coil layer for providing a recording magnetic field to the auxiliary pole layer and the main pole layer; a nonmagnetic layer; and a connection layer magnetically coupled to the main pole layer. The nonmagnetic layer is formed on the main pole layer to maintain the main pole layer at a predetermined height during manufacture, allowing independent control of the track width Tw and the height of the main pole layer. A method for manufacturing the perpendicular magnetic recording head is also provided.

17 Claims, 17 Drawing Sheets

PERPENDICULAR MAGNETIC RECORDING HEAD INCLUDING NONMAGNETIC LAYER OVERLAYING MAIN POLE LAYER

BACKGROUND OF THE INVENTION

1. Field of the Invention

The present invention relates generally to perpendicular magnetic recording heads for applying perpendicular magnetic fields to recording media such as disks having hard layers. More particularly, the present invention relates to a perpendicular magnetic recording head in which the height and the width in the track width direction of a main pole layer are controlled within predetermined ranges and to a method for making the perpendicular magnetic recording head.

2. Description of the Related Art

Perpendicular magnetic recording technology has been applied to recording devices which record high density magnetic data on recording media such as disks. FIG. 28 is a cross-sectional view showing the structure of a typical perpendicular magnetic recording head employed in such a device.

As shown in FIG. 28, a perpendicular magnetic recording head H is disposed on a side face of a slider 1 which floats and moves over a recording medium. For example, the perpendicular magnetic recording head H is disposed on a side face 1a of the slider 1 between a nonmagnetic layer 2 and a nonmagnetic coating layer 3.

The perpendicular magnetic recording head H comprises an auxiliary pole layer 4 and a main pole layer 5 both composed of a ferromagnetic material. The main pole layer 5 is disposed on the auxiliary pole layer 4 with a gap therebetween. An end face 4a of the auxiliary pole layer 4 and an end face 5a of the main pole layer 5 are exposed at an opposing face Ha opposing a recording medium M. The auxiliary pole layer 4 and the main pole layer 5 are magnetically connected at a magnetic connection portion 6 some distance inward from the opposing face Ha.

A nonmagnetic insulating layer 7 composed of an inorganic material such as $Al_2O_3$, $SiO_2$, or the like, is disposed between the auxiliary pole layer 4 and the main pole layer 5. An end face 7a of the nonmagnetic insulating layer 7 is also exposed at the opposing face Ha between the end face 4a of the auxiliary pole layer 4 and the end face 5a of the main pole layer 5.

A coil layer 8 composed of a conductive material such as copper is embedded in the nonmagnetic insulating layer 7.

As shown in FIG. 28, the thickness hw of the end face 5a of the main pole layer 5 is smaller than the thickness hr of the end face 4a of the auxiliary pole layer 4. The width of the end face 5a of the main pole layer 5 in the track width direction, i.e., the X direction in the drawing, is a track width Tw. This width is sufficiently smaller than the width of the end face 4a of the auxiliary pole layer 4 in the track width direction.

The recording medium M on which magnetic data is recorded by the perpendicular magnetic recording head H moves in the Z direction relative to the perpendicular magnetic recording head H and has a hard layer Ma on the surface and a soft layer Mb provided under the hard layer Ma.

When the coil layer 8 is energized, a recording magnetic field is induced between the auxiliary pole layer 4 and the main pole layer 5. A leakage recording magnetic field between the end face 4a of the auxiliary pole layer 4 and the end face 5a of the main pole layer 5 perpendicularly passes through the hard layer Ma and the soft layer Mb of the recording medium M. Because the area of the end face 5a of the main pole layer 5 is sufficiently smaller than the area of the end face 4a of the auxiliary pole layer 4, the magnetic flux Φ will be concentrated to the portion of the hard layer Ma opposing the end face 5a of the main pole layer 5. As a result, the magnetic data is recorded on the portion of the hard layer Ma opposing the end face 5a by the magnetic flux Φ.

FIG. 29 is a diagram illustrating a step of a method for making the perpendicular magnetic recording head shown in FIG. 28.

The main pole layer 5 is formed by plating, as shown in the drawing, using a resist layer not shown in the drawing. Subsequently, a portion 9a of a plating base layer 9 formed on the nonmagnetic insulating layer 7, the portion 9a being formed in the region not overlaid by the main pole layer 5, is removed by milling. Thus, the portion 9a is prevented from coming into contact with the lead layer for supplying electric current to the coil layer 8, and the electrical characteristics of the layer can be maintained at a satisfactory level.

However, referring to FIG. 29, during milling of the portion 9a, the top face of the main pole layer 5 is milled as well, resulting in a decrease in the height of the main pole layer 5 from L1 to L2. A decrease in the height of the main pole layer 5 will result in a decrease in the area of the end face 5a and thus degradation of the overwrite characteristics.

Moreover, removing the portion 9a will result in an increase in the track width Tw due to the adhesion of the material constituting the portion 9a onto two side faces 5b of the main pole layer 5, as indicated by arrows B. Adhered layers 9b on the two side faces 5b must be removed.

During removal of the adhered layers 9b by milling in directions A shown in FIG. 29, the top face of the main pole layer 5 is also milled, further decreasing the height of the end face 5a.

To meet the need for higher-density recording, the track width needs to be reduced. However, even when the track width Tw is reduced by milling the two side faces 5b of the end face 5a of the main pole layer 5 in an angled direction, the top face of the end face 5a is also removed, resulting in a decreased height which will result in the degradation of the recording characteristics such as the overwrite characteristics. Also, controlling the area of the end face 5a within a predetermined range has been considerably troublesome.

As described above, according to the structure of the typical perpendicular magnetic recording head shown in FIGS. 28 and 29, the adhered layers 9b on the two side faces 5b of the main pole layer 5 cannot be removed and the track width of the main pole layer 5 cannot be made smaller while maintaining the main pole layer 5 at a predetermined height. In other words, it has been impossible to separately control the height and the width in the track width direction.

SUMMARY OF THE INVENTION

It is an object of the present invention to provide a perpendicular magnetic recording head comprising a main pole layer having a reduced track width and a method for making such a head. According to the present invention, a nonmagnetic layer is formed on the main pole layer so that the adhered layers on the two side faces of the main pole layer can be removed while maintaining the main pole layer at a predetermined height.

To achieve the above object, an aspect of the present invention provides a perpendicular magnetic recording head comprising: an auxiliary pole layer; a main pole layer; and a coil layer for providing a recording magnetic field to the auxiliary pole layer and the main pole layer. A front end face of the auxiliary pole layer and a front end face of the main pole layer are exposed at an opposing face of the perpendicular magnetic recording head opposing a recording medium. These front end faces are separated by a gap therebetween. The coil layer is located inward in the height direction from the opposing face. The perpendicular magnetic recording head writes magnetic data on the recording medium by a perpendicular magnetic field concentrated to the main pole layer. The perpendicular magnetic recording head further comprises a nonmagnetic layer formed on the main pole layer and a connection layer extending from the auxiliary pole layer and being magnetically connected with the main pole layer. The connection layer is located inward in the height direction from the opposing face, and the coil layer surrounds the connection layer.

In the present invention, the nonmagnetic layer is formed on the main pole layer, as described above. The nonmagnetic layer functions as a cover for protecting the main pole layer during milling. While maintaining the main pole layer at a predetermined height, layers adhered to the two side face of the main pole layer during milling of the plating base layer can be suitably removed, and the track width Tw of the main pole layer can be further reduced. The track width and the height can be separately controlled.

According to the present invention, the front end face of the main pole layer can be formed into a desired dimensions, the area of the front end face can be easily controlled, and various characteristics such as the overwrite characteristics can be improved.

Preferably, the nonmagnetic layer comprises a nonmagnetic metal material. Preferably, the main pole layer and the nonmagnetic layer are formed by plating. In this manner, the main pole layer and the nonmagnetic layer can be sequentially formed by plating, thereby simplifying the manufacturing process.

Preferably, the main pole layer and the connection layer is magnetically coupled via a yoke layer.

Preferably, the front face of the main pole layer exposed at the opposing face is of a shape in which the width in the track width direction increases towards the top face of the main pole layer. The two sides in the track width direction of the front end face are preferably tilted, and are either straight or curved.

The perpendicular magnetic recording head may further include a plating base layer comprising a magnetic material. The main pole layer may be disposed on the plating base layer, and at least part of each of the two side faces of the plating base layer in the track width direction may be extended beyond an end of the bottom face of the main pole layer in the track width direction. The extended part is controlled to a predetermined length so that the extended part does not protrude from the recorded track width Tw1 of the recording medium when a skew angle is generated during recording on the recording medium. With this structure, fringing can be prevented, and off-track performance can be improved. Note, that the shape of the front end face of the main pole layer is limited to the shape in which the width in the track width direction increases towards the top of the main pole layer.

The perpendicular magnetic recording head may further comprise a plating base layer comprising a magnetic material. The main pole layer may be disposed on the plating base layer, and the two side faces of the plating base layer in the track width direction and the two side faces in the track width direction of the main pole layer may lie on a continuous plane. The width in the track width direction of the plating base layer may be equal to or less than the width in the track width direction of the bottom face of the main pole layer. With this structure, fringing can be more suitably and securely prevented. The shape of the front end face of the main pole layer may not be formed into the above-described shape. The front end face may be square or rectangular shape. If no skew angle is generated during recording, fringing can be prevented and off-track performance can be improved.

Preferably, the main pole layer is formed on a plating base layer comprising a nonmagnetic metal material. The width of the plating base layer comprising the nonmagnetic metal material may be larger than the width in the track width direction of the bottom face of the main pole layer. Since the plating base layer comprises a nonmagnetic metal material, fringing will not occur even when the plating base layer protrudes from the recorded track width Tw1. Thus, off-track performance can be improved.

Preferably, the saturation magnetic flux density of the main pole layer is higher than the saturation magnetic flux density of the yoke layer. Since the main pole layer and the yoke layer can be formed separately, different magnetic materials can be used to form these layers. Moreover, a magnetic material exhibiting high saturation magnetic flux density can be used in the main pole layer.

In the present invention, a perpendicular magnetic recording head according may further comprise an insulating layer embedding the coil layer, the insulating layer being disposed on the auxiliary pole layer and having the top face flush with the top face of the main pole layer. The yoke layer may be formed on the top face of the insulating layer and the top face of the connection layer and has a front end face located inward in the height direction from the opposing face. The main pole layer and the nonmagnetic layer may extend from the top face of the insulating layer to the top face of the yoke layer, the nonmagnetic layer being disposed between the front end face of the yoke layer and the opposing face.

Preferably, the front end face of the yoke layer is tilted in height direction toward the top face of the yoke layer and is either flat or curved. This structure is disclosed as a first embodiment in FIG. 1.

In the present invention, the perpendicular magnetic recording head may further comprise: a first insulating layer embedding the coil layer, the top of face of the first insulating layer being flush with the top face of the connection layer, the yoke layer being formed on the top faces of the first insulating layer and the connection layer, a front end face of the yoke layer being disposed inward in the height direction from the opposing face; and a second insulating layer provided between the front end face of the yoke layer and the opposing face, the top face of the second insulating layer being flush with the top face of the yoke layer. The main pole layer and the nonmagnetic layer may extend from the top face of the second insulating layer to the top face of the yoke layer. The front end face of the yoke layer is preferably tilted in the height direction toward the top face of the yoke layer and is preferably flat or curved. This structure is disclosed below as a second embodiment in FIG. 2.

Preferably, the area of the yoke layer is larger than the area of the main pole layer in a cross section taken at an overlapping region of the yoke layer and the main pole layer and in the direction parallel to the opposing face. In this structure, the flow and the efficiency of the magnetic flux from the yoke layer to the main pole layer can be improved.

Another aspect of the present invention provides a method for manufacturing a perpendicular magnetic recording head. The method comprises the steps of:

(a) forming an auxiliary pole layer using a magnetic material;

(b) forming a connection layer on the auxiliary pole layer at a position inward in the height direction from an opposing face of the perpendicular magnetic recording head opposing a recording medium, forming an insulating underlayer on the auxiliary pole layer between the opposing face and the connection layer, forming a coil layer on the insulating underlayer, and filling the space surrounding the coil layer with an insulating layer;

(c) milling the top face of the insulating layer so as to make the top face flush with the top face of the connection layer;

(d) forming a yoke layer on the insulating layer, the yoke layer extending up to the region above the connection layer, a front end face of the yoke layer being disposed inward in the height direction from the opposing face;

(e) forming a plating base layer on the insulating layer and the yoke layer, forming a resist layer on the plating base layer, and forming an opening in the resist layer, the opening extending from the opposing face over the insulating layer and the yoke layer;

(f) sequentially forming by plating a main pole layer and a nonmagnetic layer comprising a nonmagnetic metal material in the opening and removing the resist layer; and (g) milling the two side faces in the track width direction of the main pole layer and the two side faces in the track width direction of the nonmagnetic layer.

In the method, the main pole layer and the nonmagnetic layer are sequentially formed by plating in the opening formed in the resist layer during step (f). The main pole layer can be maintained at a predetermined height during step (g) of milling the two side faces of the main pole layer and the plating base layer since the top face of the main pole layer is protected by the nonmagnetic layer. Thus, the track width can be reduced and a narrow-track perpendicular magnetic recording head can be manufactured.

Preferably, a portion of the plating base layer not overlaid by the main pole layer is milled while keeping the portion of the plating base layer overlaid by the main pole layer in step (g) above. The top face of the nonmagnetic layer is also milled during step (g). Since the top face of the main pole layer is protected by the nonmagnetic layer, the main pole layer can be maintained at the predetermined height, and the plating base layer can be suitably removed.

Moreover, after the removal of the portion of the plating base layer, layers adhered to the two side faces of the main pole layer can be suitably removed while maintaining the main pole layer at the predetermined height.

As described above, according to the manufacturing method of this invention, the track width can be reduced and the adhered layers on the two side faces of the main pole layer can be removed while maintaining the main pole layer at a predetermined height. Thus, the present invention enables separate control of the track width and the height of the main pole layer.

In the present invention, step (d) may be omitted, and step (e) may include forming a plating base layer on the insulating layer, forming a resist layer on the plating base layer, and forming an opening in the resist layer, the opening extending from the opposing face over the insulating layer and the connection layer.

In the manufacturing method, step (e) may be replaced by the steps of:

(h) filling the space surrounding the yoke layer with a second insulating layer, milling the top face of second insulating layer to make the top face flush with the top face of the yoke layer; and (i) forming a plating base layer over the second insulating layer and the yoke layer, forming a resist layer on the plating base layer, and forming an opening in the resist layer, the opening extending from the opposite face over the second insulating layer and the yoke layer.

Preferably, steps (e) and (i) include forming an opening in the resist layer, the opening having a width in the track width direction increasing toward the top of the resist layer at least at the opposing face.

In this manner, the front end face of the main pole layer can be formed into a shape in which the width in the track width direction gradually increases toward the top face of the main pole layer.

Preferably, the plating base layer comprises a nonmagnetic metal material. With a nonmagnetic metal material, control of etching process can be simplified compared to the case in which a magnetic material is used for the plating base layer.

DESCRIPTION OF THE PREFERRED EMBODIMENTS

Figure 1:
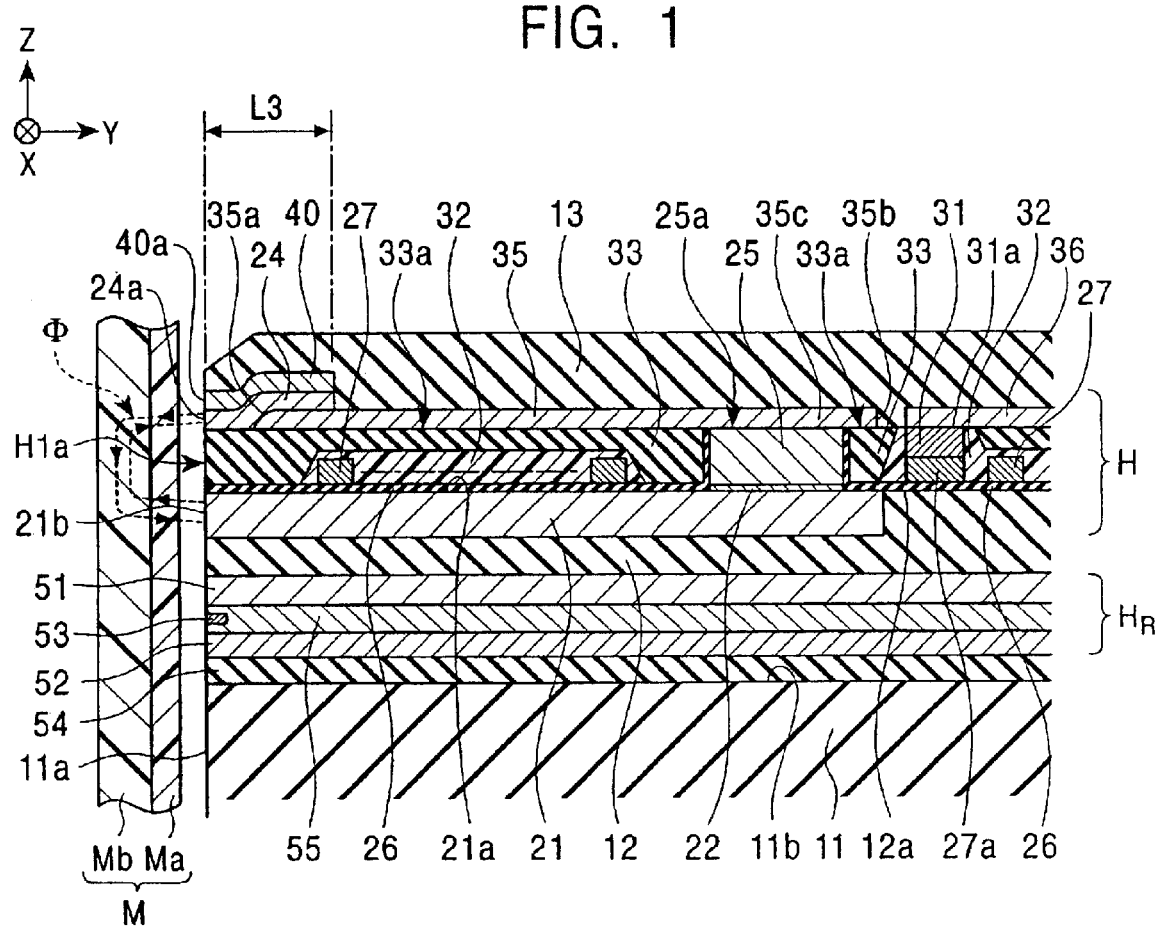
FIG. 1 is a vertical cross-sectional view of a magnetic head incorporating a perpendicular magnetic recording head according to a first embodiment of the present invention.

FIG. 1 is a vertical cross-sectional view showing the structure of a magnetic head comprising a perpendicular magnetic recording head according to a first embodiment of the present invention.

A perpendicular magnetic recording head H shown in FIG. 1 applies a perpendicular magnetic field to a recording medium M to magnetize a hard layer Ma of the recording medium M in a perpendicular direction.

The recording medium M is disk shaped. A hard layer Ma exhibiting high residual magnetization is provided on the surface of the recording medium M, and a soft layer Mb exhibiting high permeability is provided under the hard layer Ma. The recording medium M is rotated around the center of the disk.

A slider 11 of the perpendicular magnetic recording head H is composed of a ceramic material such as $Al_2O_3 \cdot TiC$. An opposing face 11a of the slider 11 opposes the recording medium M. The slider 11 is lifted from the surface of the recording medium M and slides over the recording medium M by an airflow caused by the rotation of the recording medium M. In FIG. 1, the recording medium M moves in the Z direction relative to the slider 11. The perpendicular magnetic recording head H is provided at the trailing end of the slider 11.

A nonmagnetic insulating layer 54 composed of an inorganic material such as $Al_2O_3$ or $SiO_2$ is provided on a side face 11b of the slider 11. A reading section $H_R$ is formed on the nonmagnetic insulating layer 54.

The reading section $H_R$ comprises, from the bottom, a lower shield layer 52, a gap layer 55, a magnetoresistive element 53, and an upper shield layer 51. Examples of the magnetoresistive element 53 are anisotropic magnetoresistive (AMR) elements, giant magnetoresistive (GMR) elements, and tunneling magnetoresistive (TMR) elements.

A nonmagnetic insulating layer 12 composed of an inorganic material such as $Al_2O_3$ or $SiO_2$ is formed on the upper shield layer 51. The perpendicular magnetic recording head H of the present invention is arranged on the nonmagnetic insulating layer 12. The perpendicular magnetic recording head H is coated by a protective layer 13 composed of an inorganic nonmagnetic insulative material. An opposing face H1a of the perpendicular magnetic recording head H opposing the recording medium M is substantially flush with the opposing face 11a of the slider 11.

In the perpendicular magnetic recording head H, an auxiliary pole layer 21 composed of a ferromagnetic material such as permalloy (Ni—Fe) is formed by plating. Alternatively, the lower shield layer 52 may function as the auxiliary pole layer 21. The nonmagnetic insulating layer 12 is formed under the auxiliary pole layer 21, i.e., at the space between the auxiliary pole layer 21 and the side face 11b of the slider 11, and around the auxiliary pole layer 21. As shown in FIG. 1, a surface (top face) 21a of the auxiliary pole layer 21 and a surface (top face) 12a of the nonmagnetic insulating layer 12 are flush with each other.

As shown in FIG. 1, in a region some distance inward, i.e., in the Y direction in the drawing, from the opposing face H1a, a connection layer 25 composed of Ni—Fe or the like is formed on the surface 21a of the auxiliary pole layer 21.

In the vicinity of the connection layer 25, insulating underlayer 26 composed of $Al_2O_3$ or the like is formed on the surface 21a of the auxiliary pole layer 21 and on the surface 12a of the nonmagnetic insulating layer 12. A coil layer 27 composed of a conductive material such as Cu is formed on the insulating underlayers 26. The coil layer 27 is formed by frame-plating in the vicinity of the connection layer 25 and is patterned in the shape of a spiral of a predetermined number of windings. A planarizing layer 31 composed of a conductive material such as Cu is formed on a connection end 27a of the coil layer 27 located near the center of the windings.

The coil layer 27 and the planarizing layer 31 are coated by insulating layers 32 composed of an organic material such as a resist material and are further coated by an insulating layer 33.

The insulating layer 33 is preferably composed of at least one inorganic insulative material. Examples of the inorganic insulative material are AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

The surface (top face) 25a of the connection layer 25, the surface (top face) 31a of the planarizing layer 31, and the surface (top face) 33a of the insulating layer 33 are subjected to a planarization process. The planarization process is, as described below, performed by chemical mechanical polishing (CMP).

In the first embodiment, a yoke layer 35 is formed on the permanent magnetic layer 33. As shown in FIG. 1, a front end face 35a of the yoke layer 35 is disposed in a region inward (the Y direction in the drawing) from the opposing face H1a. A rear portion 35c of the yoke layer 35 is formed on the top face of the connection layer 25 and is thereby magnetically coupled to the connection layer 25. Since the insulating layer 33 under the yoke layer 35 is planarized, the yoke layer 35 can be patterned with high precision.

In this embodiment, the front end face 35a is formed into a flat face or a curved face tilting from the bottom left to the top right in the drawing. Such an arrangement simplifies formation of a main pole layer 24 extending from the end of the insulating layer 33 at the opposing-face H1a side to a portion of the yoke layer 35 by plating, as described below. Moreover, the flux flow from the yoke layer 35 to the main pole layer 24 can be moderated, and the magnetic flux can travel with high efficiency.

As shown in FIG. 1, a lead layer 36 is formed on the surface 31a of the planarizing layer 31 to supply recording current from the lead layer 36 to the planarizing layer 31 and the coil layer 27. The lead layer 36 and the yoke layer 35 may be composed of the same material and may be formed simultaneously by plating.

As shown in FIG. 1, the main pole layer 24 composed of a magnetic material such as NiFe is formed over a region of the insulating layer 33 extending from the opposing face H1a to the front end face 35a and over a portion of the yoke layer 35. A nonmagnetic layer 40 is formed over the main pole layer 24. Front end faces 24a and 40a of the main pole layer 24 and the nonmagnetic layer 40, respectively, are exposed at the opposing face H1a.

In the embodiment shown in FIG. 1, the main pole layer 24 and the nonmagnetic layer 40 are each formed to have a length L3 in the height direction from the opposing face H1a. No limitation is imposed as to the length L3 as long as the main pole layer 24 and the yoke layer 35 overlap each other at least partly and are magnetically connected. The lengths of the main pole layer 24 and the nonmagnetic layer 40 in the height direction may be increased. For example, the main pole layer 24 and the nonmagnetic layer 40 may be extended up to a rear end 35b of the yoke layer 35.

Referring to FIG. 1, the nonmagnetic layer 40 and the yoke layer 35 are coated by the protective layer 13.

Figure 2:
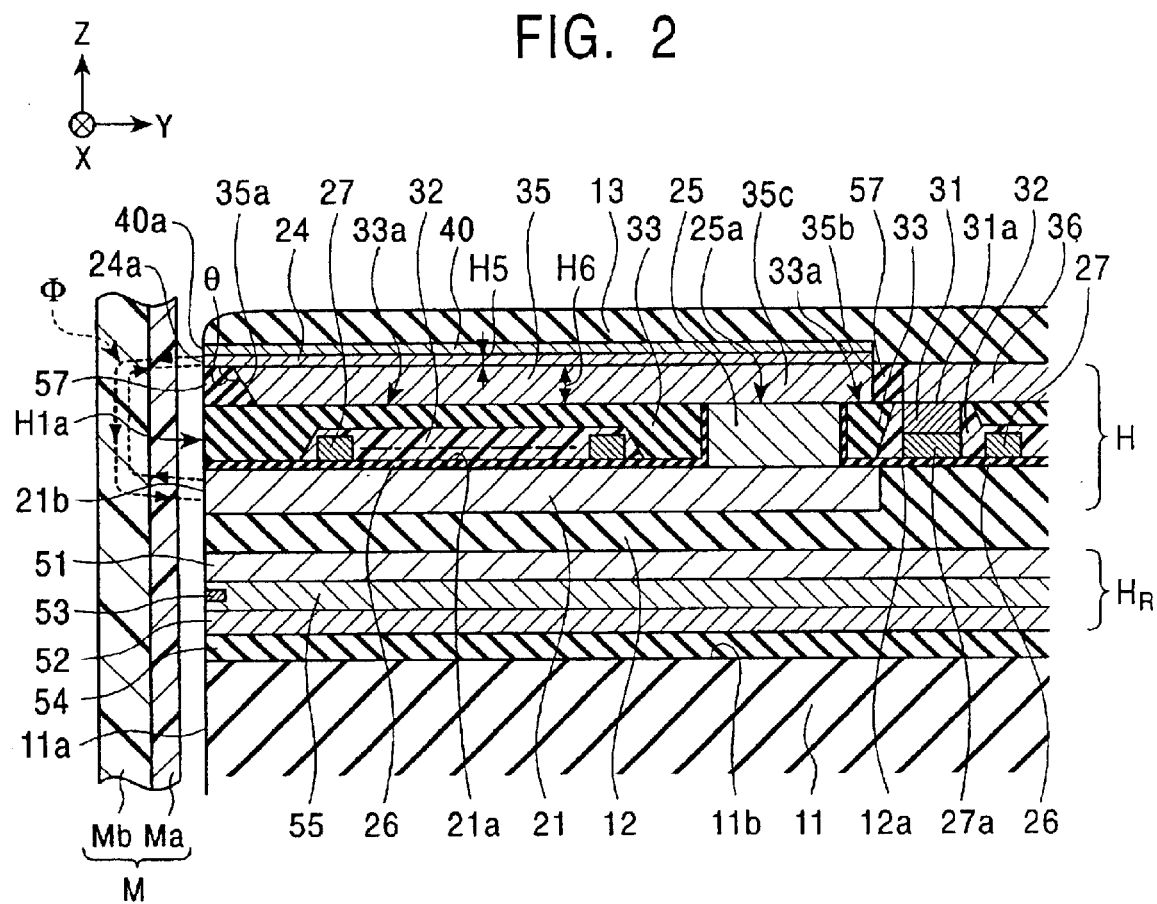
FIG. 2 is a vertical cross-sectional view of a magnetic head incorporating a perpendicular magnetic recording head according to a second embodiment of the present invention.

FIG. 2 is a vertical cross-sectional view of a magnetic head incorporating a perpendicular magnetic recording head according to a second embodiment of the present invention.

This perpendicular magnetic recording head differs from that shown in FIG. 1 particularly in the structure of the yoke layer 35. In FIG. 2, the yoke layer 35 is formed on the top face 33a of the insulating layer 33, and the rear portion 35c of the yoke layer 35 is formed on the top face 25a of the connection layer 25. The rear portion 35c and the connection layer 25 are magnetically connected.

As shown in FIG. 2, the front end face 35a of the yoke layer 35 is disposed at some distance inward in the height direction (the Y direction in the drawing) from the opposing face H1a and is not exposed at the opposing face H1a.

The front end face 35a is formed into a flat face or a curved face tilting from the top left to the bottom right in the drawing. The external angle θ defined by the front end face 35a and the top face is preferably 90° or more. At such an angle, a magnetic field leaking from the main pole layer 24 to the yoke layer 35 described below can be minimized, and the magnetic field can be concentrated to the main pole layer 24.

As shown in FIG. 2, a second insulating layer 57 fills the gap between the front end face 35a and the opposing face H1a. The second insulating layers 57 are also formed at the regions adjacent to two side faces of the yoke layer 35 in the track width direction, i.e., the X direction in the drawing, and at the region behind the yoke layer 35.

In FIG. 2, the second insulating layer 57 located in front of the front end face 35a of the yoke layer 35 is exposed at the opposing face H1a.

In this invention, the top faces of the second insulating layer 57 and the yoke layer 35 are subjected to CMP planarization.

The second insulating layer 57 is preferably composed of at least one inorganic insulative material. Examples of the inorganic insulative material are AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

In this invention, the main pole layer 24 is formed overlaying the second insulating layer 57 and the yoke layer 35. Since the main pole layer 24 is formed on the planarized surface, the main pole layer 24 can be patterned with high precision. The front end 24a of the main pole layer 24 is exposed at the opposing face H1a. Although the yoke layer 35 in FIG. 2 is extended up to the top of the rear end 35b of the yoke layer 35, the length of the main pole layer 24 may be shorter as long as the yoke layer 35 and the main pole layer 24 overlap each other at least partly and are magnetically connected.

As shown in FIG. 2, the main pole layer 24 and the nonmagnetic layer 40 overlap each other, the nonmagnetic layer 40 being on the top of the main pole layer 24. The nonmagnetic layer 40 also extends up to the rear end 35b of the yoke layer 35.

Figure 3:
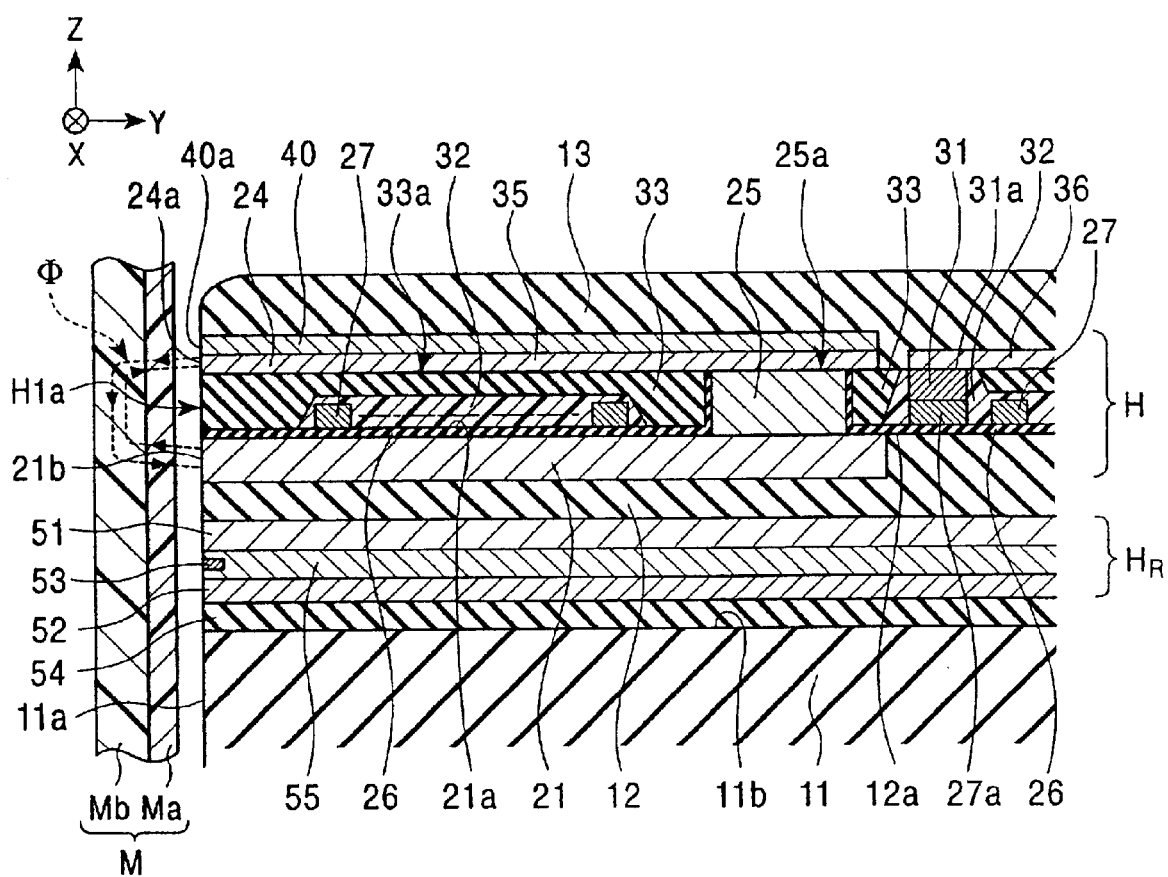
FIG. 3 is vertical cross-sectional view of a magnetic head incorporating a perpendicular magnetic recording head according to a third embodiment of the present invention.

FIG. 3 is a vertical cross-sectional view of a magnetic head incorporating a perpendicular magnetic recording head according to a third embodiment of the present invention.

In FIG. 3, unlike in FIGS. 1 and 2, the main pole layer 24 is formed on the planarized insulating layer 33 and the nonmagnetic layer 40 is formed overlaying the main pole layer 24. The yoke layer 35 in this embodiment is integrated into the main pole layer 24 and the rear portion of the main pole layer 24 functions as the yoke layer 35. The yoke layer 35 and the connection layer 25 are magnetically connected.

Figure 4:
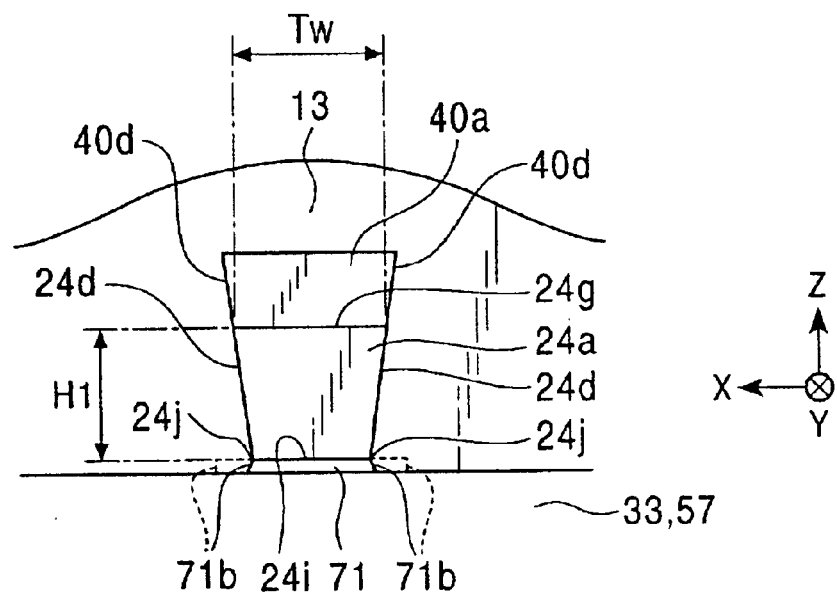
FIG. 4 is a partial front view of the perpendicular magnetic recording head of the present invention.
Figure 5:
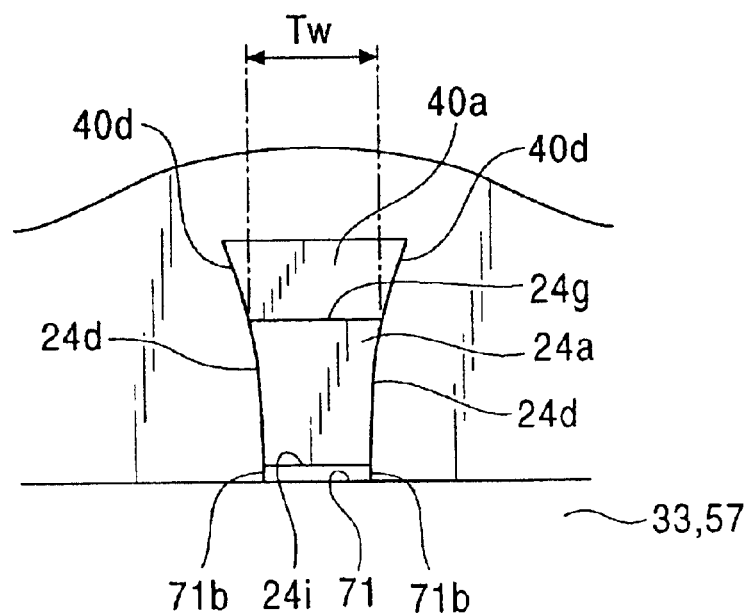
FIG. 5 is another partial front view of the perpendicular magnetic recording head of the present invention.

The shapes of the front ends 24a and 40a of the main pole layer 24 and the nonmagnetic layer 40, respectively, according to the present invention will now be described. FIGS. 4 and 5 are partial front views of the perpendicular magnetic recording heads shown in FIGS. 1 to 3.

As shown in FIGS. 4 and 5, a plating base layer 71 is formed between the main pole layer 24 and either the insulating layer 33 or the second insulating layer 57. The main pole layer 24 is grown on the plating base layer 71 by plating up to a predetermined height H1.

As shown in FIGS. 4 and 5, two side faces 24d of the main pole layer 24 are formed such that the width of the front end face 24a in the track width direction, i.e., the X direction in the drawing, gradually increases toward the top of the front end 24a. Preferably, the two sides in the track width direction of the front end face 24a are straight, as shown in FIG. 4, or curved, as shown in FIG. 5.

As shown in FIGS. 4 and 5, the width in the track width direction of the front end 40a of the nonmagnetic layer 40 formed on the main pole layer 24 also increases toward the top of the front end 40a. As shown in FIGS. 4 and 5, two side faces 40d of the nonmagnetic layer 40 and the two side faces 24d of the main pole layer 24 are on a continuous plane. The two side faces 40d of the nonmagnetic layer 40 in FIG. 4 are flat and those in FIG. 5 are curved.

Note that the track width Tw is regulated by the width of a top face 24g (the trailing end face) of the main pole layer 24 in the track width direction, as shown in FIGS. 4 and 5.

One of the features of the present invention is that the nonmagnetic layer 40 is formed on the main pole layer 24.

The nonmagnetic layer 40 functions as a cover for preventing the height of the main pole layer 24 from decreasing due to milling.

As described below in relation with a manufacturing method, the plating base layer 71 must be formed in order to form the main pole layer 24 by plating according to the present invention. Since the plating base layer 71 is also formed in the region other than the region overlaid by the main pole layer 24, the step of removing the plating base layer 71 formed in the region other than the region overlaid by the main pole layer 24 is necessary. The plating base layer 71 is removed, for example, by milling.

In removing the unnecessary portion of the plating base layer 71 by milling, the top face of the nonmagnetic layer 40 as well as the plating base layer 71 will be milled since the nonmagnetic layer 40 is formed on the main pole layer 24 in this invention. Thus, the height Hi of the main pole layer 24 does not decrease. In other words, the unnecessary plating base layer 71 can be removed while maintaining the height H1 at a predetermined height.

Removal of the unnecessary portion of the plating base layer 71 will cause the material constituting the plating base layer 71 to adhere to the two side faces 24d of the main pole layer 24 in the track width direction (the X direction in the drawing). Even when a milling process is performed in an inclined direction to remove these adhered layers, only the top face of the nonmagnetic layer 40, i.e. not the main pole layer 24, will be removed along with the adhered layers. Thus, the height H1 of the main pole layer 24 does not decrease, and the adhered layers can be removed while maintaining the height H1 at a predetermined height.

Moreover, when the two side faces 24d of the main pole layer 24 are removed by milling in an inclined direction, the track width Tw regulated by the width of the top face 24g (trailing end face) of the main pole layer 24 can be made smaller, contributing to the manufacture of a narrow-track perpendicular magnetic recording head. Since only the top face of the nonmagnetic layer 40 is milled along with the two side faces 24d in the milling step, the track can be made smaller while maintaining the height Hi of the main pole layer 24 at a predetermined height.

In this invention, the layers of the material constituting the plating base layer 71 adhering to the two side faces 24d of the main pole layer 24 can be removed and the track width can be reduced without decreasing the height of the main pole layer 24.

In other words, in this invention, the height and the track width in the track width direction of the main pole layer 24 can be independently controlled. The height of the main pole layer 24 can be defined as the height of the main pole layer 24 grown by plating; the width in the track width direction can be controlled by milling.

Thus, according to the present invention, the height Hi and the track width Tw of the main pole layer 24 can be set at predetermined dimensions, and the front end face 24a of the main pole layer 24 can be suitably controlled to be within a predetermined area. The track width can be minimized, and various characteristics such as overwrite characteristics can be improved.

Preferably, the nonmagnetic layer 40 is composed of a nonmagnetic metal material. Examples of the nonmagnetic metal material are NiP, NiCu, NiMn, NiW, NiB, Pd, Rh, Ru, Au, and Cu. More preferably, the nonmagnetic layer 40 is composed of NiP.

When the above nonmagnetic metals are used, the main pole layer 24 and the nonmagnetic layer 40 can be sequentially formed by plating, thus simplifying the manufacturing process.

When the nonmagnetic layer 40 is formed by plating, the thickness of the nonmagnetic layer 40 can be suitably controlled. Since the top face of the nonmagnetic layer 40 is milled during the milling step as described above, the thickness of the nonmagnetic layer 40 must be sufficiently large. A plating process is suitable for making the nonmagnetic layer 40 having a sufficient thickness.

When the nonmagnetic layer 40 is composed of NiP, not only are continuous plating and simplification of the manufacturing process possible, as described above, but also the resulting nonmagnetic layer 40 will exhibit a superior heat resistance and satisfactory adhesiveness to the main pole layer 24. Moreover, the resulting nonmagnetic layer 40 will have the same hardness as the main pole layer 24. Thus, the processing rates such as milling rates of the nonmagnetic layer 40 and the main pole layer 24 can be made uniform, thereby improving processability.

Alternatively, the nonmagnetic layer 40 may be composed of a common nonmagnetic material such as $Al_2O_3$. In this case, the nonmagnetic layer 40 will be formed by sputtering.

In the perpendicular magnetic recording head shown in FIGS. 1 and 2 of the present invention, the main pole layer 24 and the yoke layer 35 may be formed separately. Thus, the main pole layer 24 and the yoke layer 35 can be composed of different materials. In such a case, the magnetic materials are preferably selected such that the saturation magnetic flux density of the main pole layer 24 is higher than that of the yoke layer 35. With the main pole layer 24 composed of a magnetic material having a higher saturation magnetic flux density than that of the yoke layer 35, a high-density magnetic flux Φ in the perpendicular direction can be applied to the hard layer Ma from the main pole layer 24 having a smaller track width Tw and thickness. Thus, the overwriting characteristics are improved.

The main pole layer 24 and the yoke layer 35 are composed of a magnetic material such as Ni—Fe, Co—Fe, Ni—Fe—Co, and the like. When the main pole layer 24 and the yoke layer 35 are composed of the same material, the composition ratio of the selected material may be changed to yield different saturation magnetic flux densities between these two layers.

Figure 11:
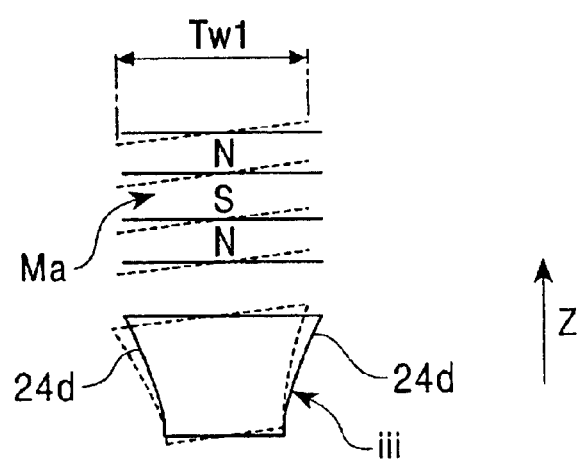
FIG. 11 is an illustration explaining generation of a skew angle in the magnetic head of the present invention.

In the present invention, the width in the track width direction of the front end face 24a of the main pole layer 24 gradually increases from the bottom toward the top. For example, the two sides in the track width direction of the front end face 24a are straight or curved and are tilted, thereby forming the front end face 24a substantially having the shape of an inverted trapezoid. Referring now to FIG. 11, when the two sides of the front end face 24a of the main pole layer 24 are straight or curved and the front end face 24a substantially has the shape of an inverted trapezoid, the side faces 24d indicated by (iii) will not protrude from a recorded track width Tw1 even when a skew angle is generated relative to the tangential direction with respect to motion of the recording medium (the Z direction in the drawing), as shown by broken lines, during recording. Thus, the fringing caused by the two side faces 24d can be prevented, and off-track performance can be improved.

Figure 28:
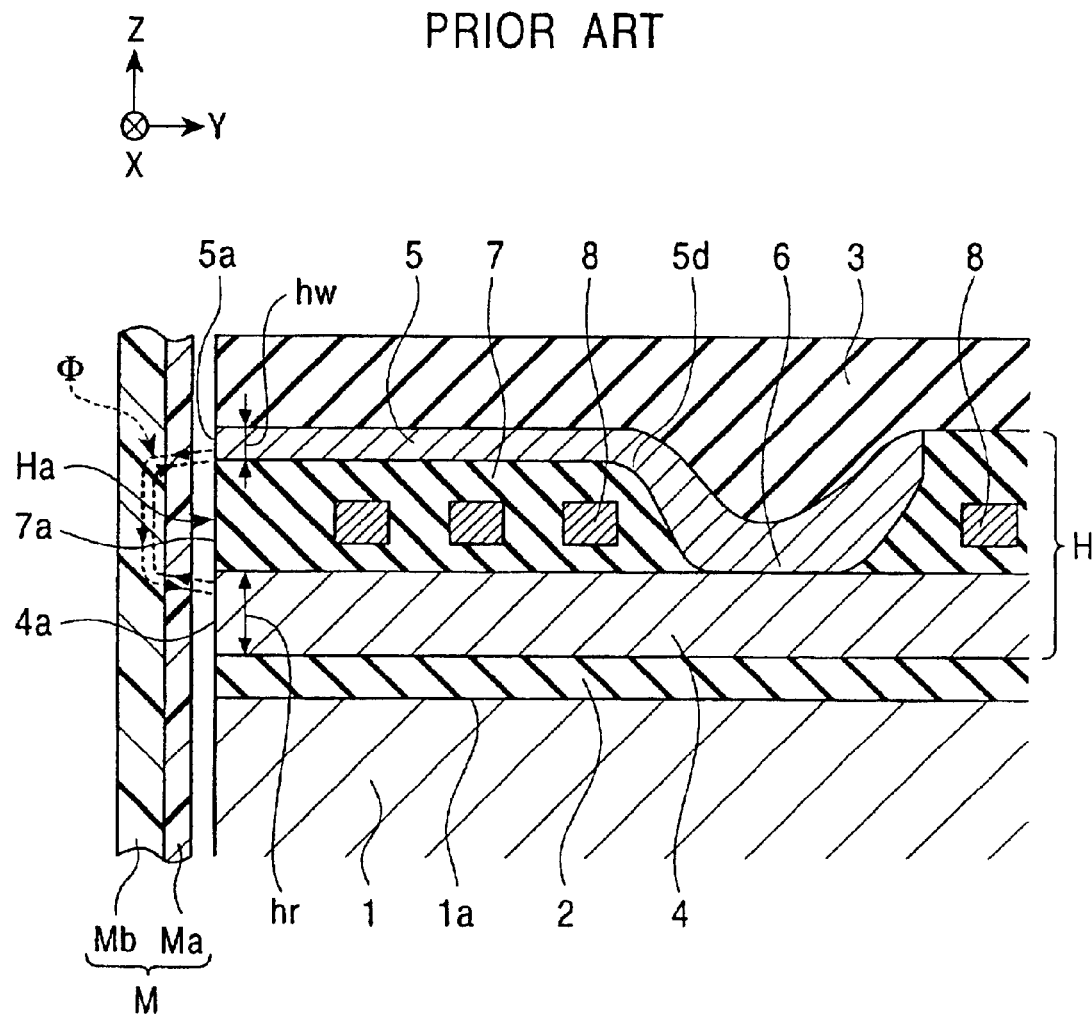
FIG. 28 is a vertical cross-sectional view showing the structure of a related art perpendicular magnetic recording head.
Figure 29:
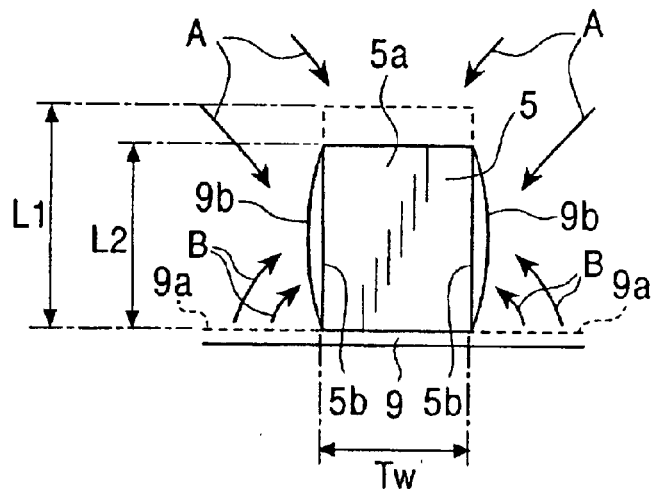
FIG. 29 is a front view showing a step of manufacturing the related art perpendicular magnetic recording head shown in FIG. 28.
Figure 30:
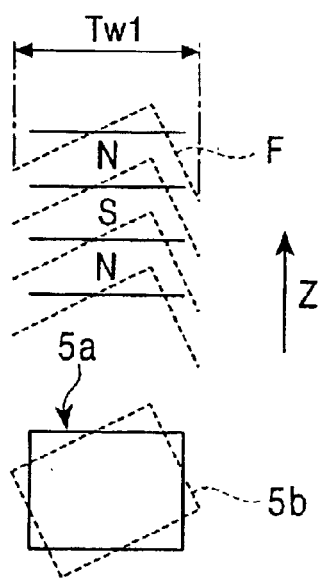
FIG. 30 is an illustration for explaining the generation of the skew angle in the related art perpendicular magnetic recording head.

FIG. 30 is a front view of a conventional main pole layer 5 shown in FIG. 28. The main pole layer 5 has an end face 5a of a square or rectangular shape, as shown in FIG. 30. When a skew angle is generated between the end face 5a of the main pole layer 5 and the tangential direction with respect to motion of the recording medium (the Z direction in the drawing), the sides 5b of the main pole layer 5 apply a leakage magnetic field to the recorded track width Tw1 in an inclined direction, as shown by the broken lines, thus causing fringing F. Consequently, the off-track performance is degraded.

In view of the above, preferably, the front end face 24a of the main pole layer 24 substantially has the shape of an inverted trapezoid.

The material and the shape of the plating base layer 71 shown in FIGS. 4 and 5 will now be described.

In forming the plating base layer 71 composed of a magnetic material such as NiFe, two side faces 71b of the plating base layer 71 and the two side faces 24d of the main pole layer 24 are preferably on a continuous plane. That is, the width of the top face of the plating base layer 71 in the track width direction is the same as that of a bottom face 24i of the main pole layer 24. The width of the plating base layer 71 in the track width direction may be maintained the same as that of the bottom face 24i of the main pole layer 24 or may gradually decrease toward the bottom base of the plating base layer 71.

With the width of the front end face 24a of the main pole layer 24 gradually increasing from the bottom to the top, fringing can be suitably prevented even when a skew angle is generated. If no skew angle is generated, fringing can be prevented even when the front end face 24a of the main pole layer 24 is in the shape of a square or rectangle.

Referring to FIG. 4, even when the two side faces 71b of the plating base layer 71 in the track width direction (the X direction in the drawing) and the two side faces 24d of the main pole layer 24 in the track width direction are on a continuous plane, at least part of the side faces 71b of the plating base layer 71 may sometimes be formed beyond ends 24j of the bottom face 24i of the main pole layer 24 in the track width direction depending on the accuracy of the milling process.

Alternatively, as shown by the broken lines in FIG. 4, the entire side faces 71b of the plating base layer 71 may be formed beyond the ends 24j of the bottom face 24i of the main pole layer 24 in the track width direction.

In the above cases, the extended portions of the plating base layer 71 beyond the recorded track width Tw1 will cause fringing if a skew angle is generated during recording (refer to FIG. 11). This is also the case even when the front end face 24a of the main pole layer 24 is formed with its width in the track width direction increasing towards the top.

Figure 26:
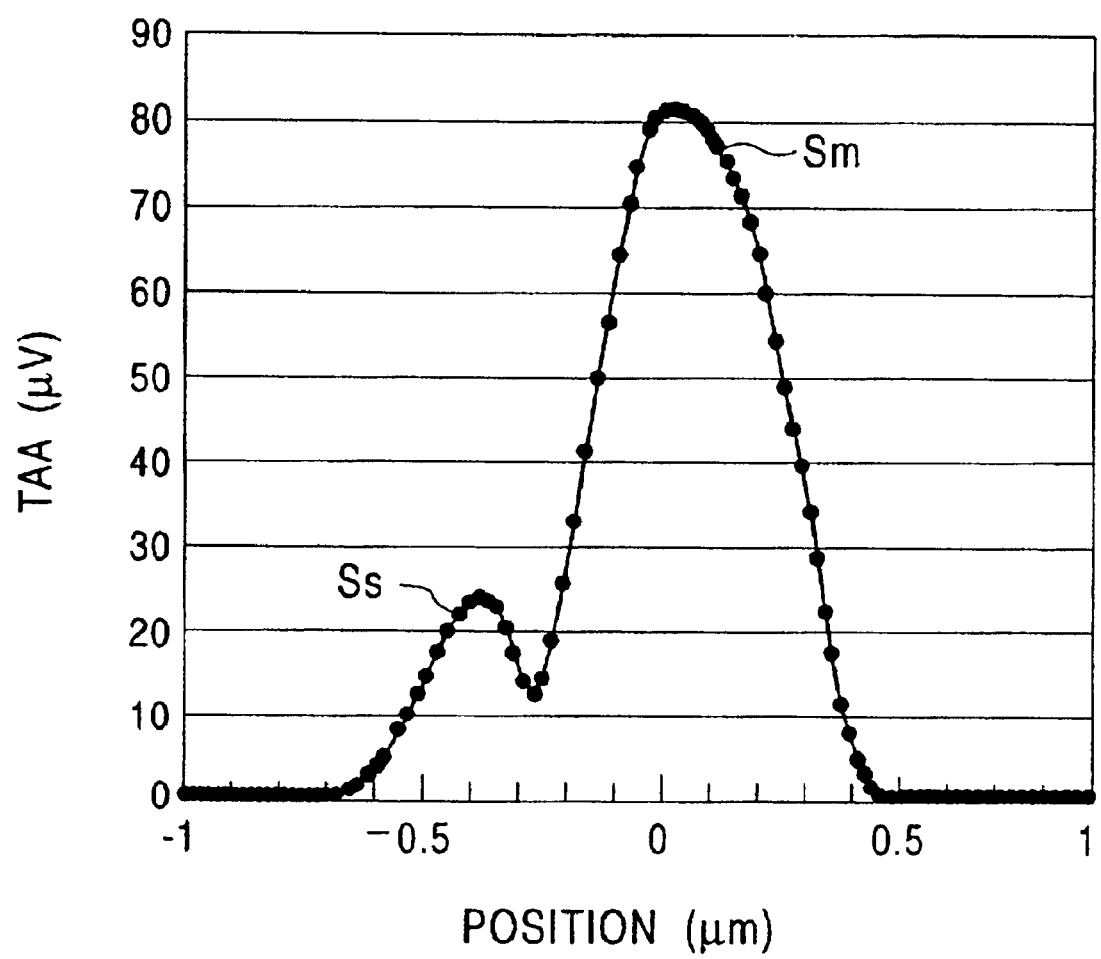
FIG. 26 is a graph showing the magnetic recording characteristics of the perpendicular magnetic recording head in which a magnetic plating base layer remains at the region not overlaid by the main pole layer.

FIG. 26 is a graph showing magnetic recording characteristics of the perpendicular magnetic recording head as determined by a micro track profiling method. In this recording head, the plating base layer 71 is composed of a magnetic material and remains in the regions other than the region overlaid by the main pole layer 24.

In the micro track profiling method, a read element such as a magnetoresistive element scans a recording medium on which signals are recorded in micro tracks in the track width direction to readout the signals and to determine the intensity distribution of the recorded signals on the recording tracks in the track width direction.

As shown in FIG. 26, when the plating base layer 71 composed of a magnetic material extends beyond the region under the main pole layer 24, both peaks of a main signal Sm and a side signal Ss appear on the recording tracks due to the skew angle. The side signal Ss is fringing caused by the portion of the plating base layer 71 extending beyond the recorded track width Tw1.

As described above, when the plating base layer 71 is composed of a magnetic material and the side faces 71b of the plating base layer 71 extend beyond the ends 24j of the bottom face 24i of the main pole layer 24, as shown in FIG. 4, fringing is readily generated. However, if the extended portion is of such a size that the plating base layer 71 does not extend beyond the recorded track width Tw1 when a skew angle is generated during recording, fringing can be prevented.

Thus, in forming the plating base layer 71 composed of a magnetic material, the milling accuracy should be suitably controlled to reduce the extended portions of the plating base layer 71 as much as possible so that when a skew angle is generated during recording, the extended portions will still be within the recorded track width Tw1.

In contrast, when the plating base layer 71 is composed of a nonmagnetic metal material such as Cu, the extended portions of the plating base layer 71 need not to be considered. The plating base layer 71 composed of a nonmagnetic metal material does not perform recording. Thus, even when a skew angle is generated and the plating base layer 71 is extended beyond the recorded track width Tw1, no fringing is generated, and off-track characteristics are improved.

Figure 27:
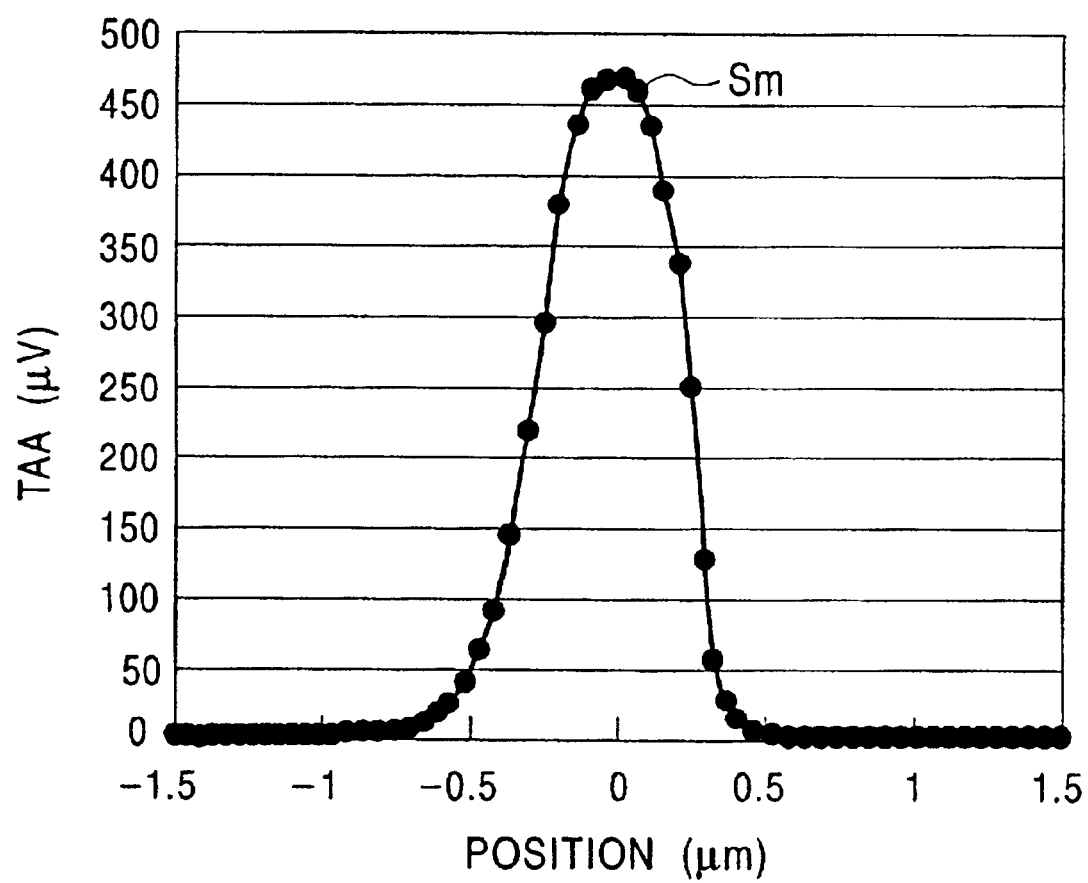
FIG. 27 is a graph showing the magnetic recording characteristics of the perpendicular magnetic recording head in which a nonmagnetic plating base layer composed of a metal material remains at the region not overlaid by the main pole layer.

FIG. 27 is a graph showing the magnetic recording characteristics of another perpendicular magnetic recording head determined by the micro track profiling method. In this recording head, the plating base layer 71 is composed of a nonmagnetic material and extends beyond the region under the main pole layer 24.

As shown in FIG. 27, although the plating base layer 71 composed of a nonmagnetic material remains in the region other than the region under the main pole layer 24, only a peak of a main signal Sm appears on the recording track and no side signal Ss, i.e., fringing, is detected.

Accordingly, the plating base layer 71 is preferably composed of a nonmagnetic metal material since the milling process can be easily controlled.

Next, the shape of the main pole layer 24 and the yoke layer 35 as viewed from the top will be described. The description below is applicable to both perpendicular magnetic recording heads shown in FIGS. 1 and 2.

Figure 6:
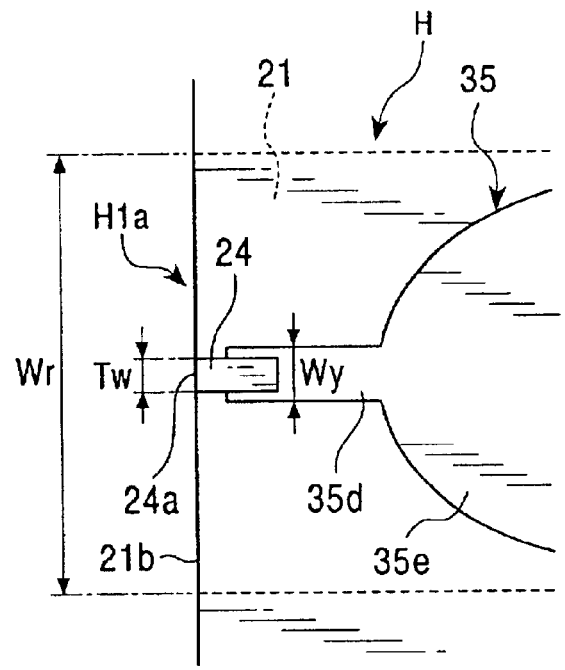
FIG. 6 is a plan view of the perpendicular magnetic recording head shown in FIG. 1 or 2.

As shown in FIG. 6, in the yoke layer 35, the width Wy in the track width direction is smaller in a front region 35d near the opposing face H1a and gradually increases toward a rear region 35e. The main pole layer 24 is provided on the front region 35d. The width Wy of the front region 35d in the track width direction (the X direction in the drawing) is larger than the track width Tw.

As shown in FIG. 6, the top face (trailing end) of the front end face 24a of the main pole layer 24 is regulated by the track width Tw. The main pole layer 24 extends in the height direction, the width thereof being maintained at the track width or being slightly larger than the track width. The length of the main pole layer 24 in the height direction is small.

In this invention, the front end face 24a of the main pole layer 24 exposed at the opposing face H1a needs to be larger than the area of the front end face 21b of the auxiliary pole layer 21. For example, as shown in FIG. 6, the width Wr of the auxiliary pole layer 21 in the track width direction is, preferably, substantially larger than the track width Tw.

Figure 7:
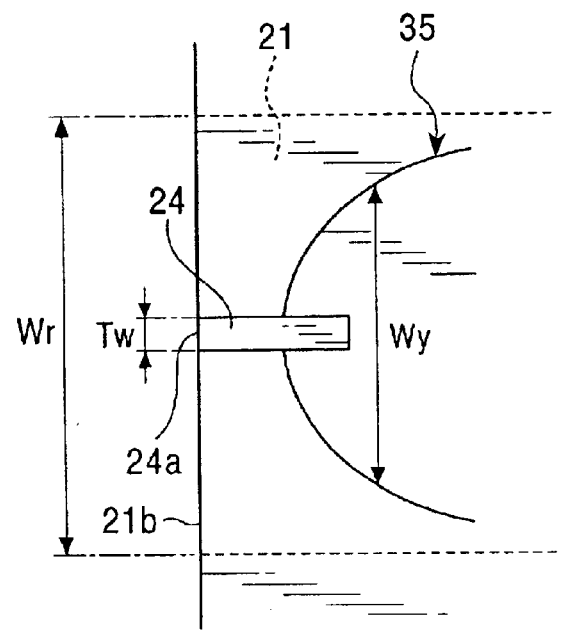
FIG. 7 is another plan view of the perpendicular magnetic recording head shown in FIG. 1 or 2.

Referring now to FIG. 7, the yoke layer 35 without the front region 35d has the width Wy gradually increasing toward the back side. The main pole layer 24 is disposed on the yoke layer 35.

As shown in FIG. 7, the top face (trailing end) of the front end face 24a of the main pole layer 24 is regulated by the track width Tw. The main pole layer 24 extends in the height direction, the width thereof maintaining the track width or being slightly larger than the track width. The length of the main pole layer 24 in the height direction is small.

Figure 8:
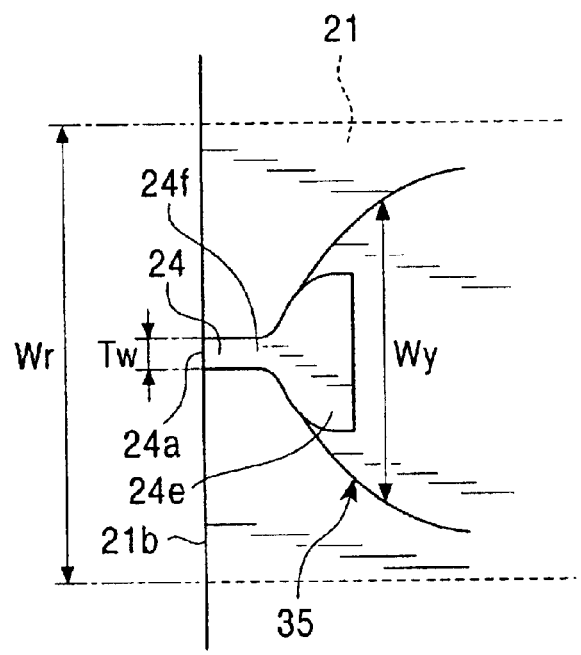
FIG. 8 is another plan view of the perpendicular magnetic recording head shown in FIG. 1 or 2.

The yoke layer 35 shown in FIG. 8 has substantially the same shape as that shown in FIG. 7. The width of the rear region 24e of the main pole layer 24 gradually increases, and the rear region 24e is disposed on the yoke layer 35. Alternatively, the yoke layer 35 may be formed closer to the opposing face H1a, and a portion of a front region 24f having the shape of a narrow strip may be disposed on the yoke layer 35.

Moreover, a front region 35d shown in FIG. 6 may be formed in the yoke layer 35.

Figure 9:
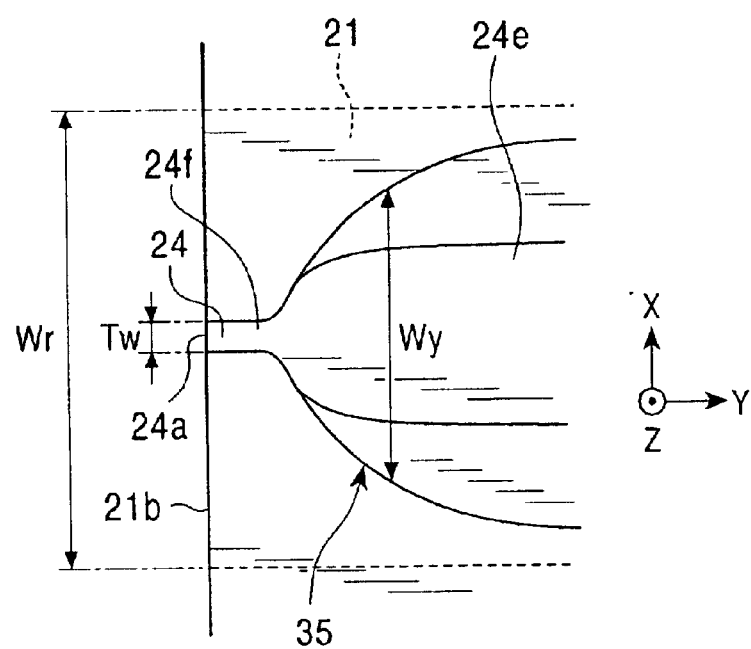
FIG. 9 is another plan view of the perpendicular magnetic recording head shown in FIG. 1 or 2.

The yoke layer 35 shown in FIG. 9 has the same shape as that shown in FIGS. 7 and 8. The width of the rear region 24e of the main pole layer 24 gradually increases toward the rear side and extends by a large amount in the height direction (the Y direction in the drawing). The rear region 24e may be extended up to the rear end 35b of the yoke layer 35, as shown in FIG. 2.

The yoke layer 35 may be provided with the front region 35d shown in FIG. 6. Moreover, the main pole layer 24 may be without the rear region 24e having a gradually increasing width and may include a front region 24f extending in the height direction and having the shape of a narrow strip maintaining a track width Tw or a width slightly larger than the track width.

All the yoke layers 35 shown in FIGS. 6 to 9 are provided with a region having a width Wy gradually increasing toward the rear side. In the overlapping region of the yoke layer 35 and the main pole layer 24, the width of the yoke layer 35 in the track width direction is larger than the width of the main pole layer 24 in the track width direction.

The thickness of the yoke layer 35 may be the same as that of the main pole layer 24. Alternatively, as shown in FIG. 2, the thickness H6 of the yoke layer 35 may be larger than the thickness H5 of the main pole layer 24.

As a result, at the overlapping region of the yoke layer 35 and the main pole layer 24, the cross section of the yoke layer 35 taken along the direction parallel to the opposing face H1a is larger than that of the main pole layer 24. Thus, a recording magnetic field can be suitably introduced from the yoke layer 35 to the main pole layer 24, thus improving the magnetic flux transmission efficiency and overwrite characteristics.

In a structure where the main pole layer 24 and the yoke layer 35 are separately formed, as shown in FIGS. 1 and 2, the main pole layer 24 is preferably provided with the front region 24f having the shape of a narrow strip and having a substantially large length. In this manner, the width of the entire front region 24f can be accurately formed to have the track width Tw by patterning. Moreover, by forming the yoke layer 35 as close to the opposing face H1a as possible, the magnetic saturation of the main pole layer 24 can be inhibited, and the magnetic flux can be concentrated to the main pole layer 24.

It should be noted that the shapes of the main pole layer 24 and the yoke layer 35 shown in FIGS. 6 to 9 are merely examples and do not pose limitations as to the shapes of these layers. In this invention, the shapes of the main pole layer 24 and the yoke layer 35 may be any shape as long as the cross section of the yoke layer 35 taken along the direction parallel to the opposing face H1a is larger than that of the main pole layer 24 at the overlapping region of the main pole layer 24 and the yoke layer 35.

Figure 10:
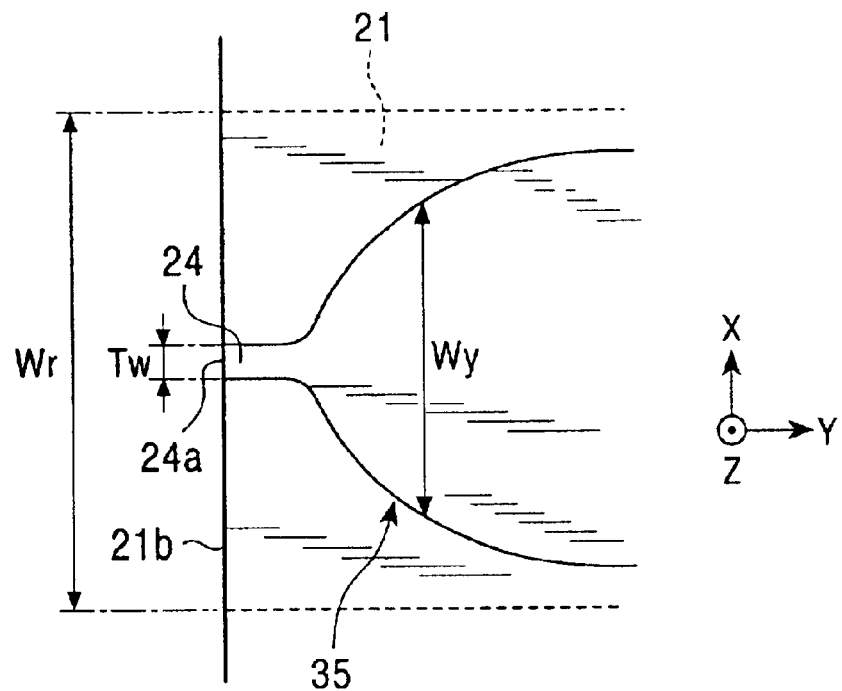
FIG. 10 is a plan view of the perpendicular magnetic recording head shown in FIG. 3.

FIG. 10 is a plan view of the perpendicular magnetic recording head shown in FIG. 3. The front end face 24a has a width corresponding to the track width. The main pole layer 24 has the shape of a narrow strip, the width thereof being maintained at the track width or a width slightly larger than the track width. The yoke layer 35 extends from the rear end of the main pole layer 24 and has a width in the track width direction, i.e., the X direction in the drawing, which gradually increases towards the back side.

In each of the perpendicular magnetic recording heads shown in FIGS. 1 to 3, a recording current supplied to the coil layer 27 through the lead layer 36 induces a recording magnetic field in the auxiliary pole layer 21 and the yoke layer 35. As shown in FIGS. 1 to 3, at the opposing face H1a, a leakage recording magnetic field from the front end face 24a of the main pole layer 24 and from the front end face 21b of the auxiliary pole layer 21 passes through the hard layer Ma and the soft layer Mb of the recording medium M. Since the area of the front end face 24a of the main pole layer 24 is sufficiently smaller than the area of the front end face 21b of the auxiliary pole layer 21, the magnetic flux $\Phi$ of the leakage recording magnetic field is concentrated at the front end face 24a of the main pole layer 24. The concentrated magnetic flux $\Phi$ magnetizes the hard layer Ma in the perpendicular direction to record magnetic data.

Figure 12:
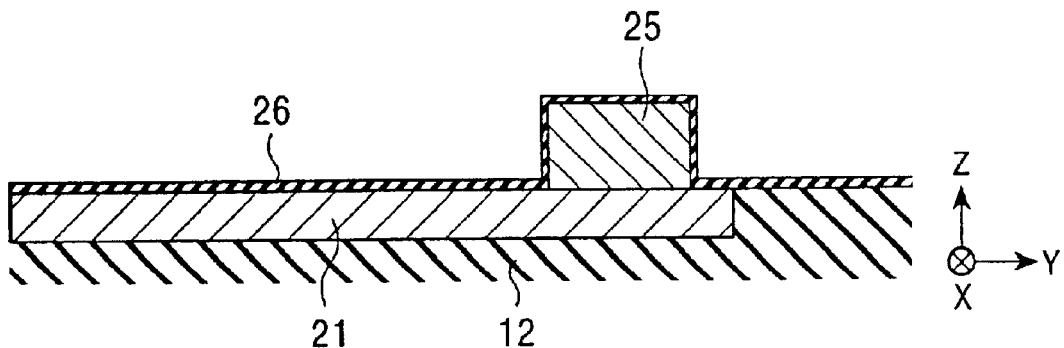
FIG. 12 is a diagram showing a step in a method for manufacturing the perpendicular magnetic recording head of the present invention.
Figure 13:
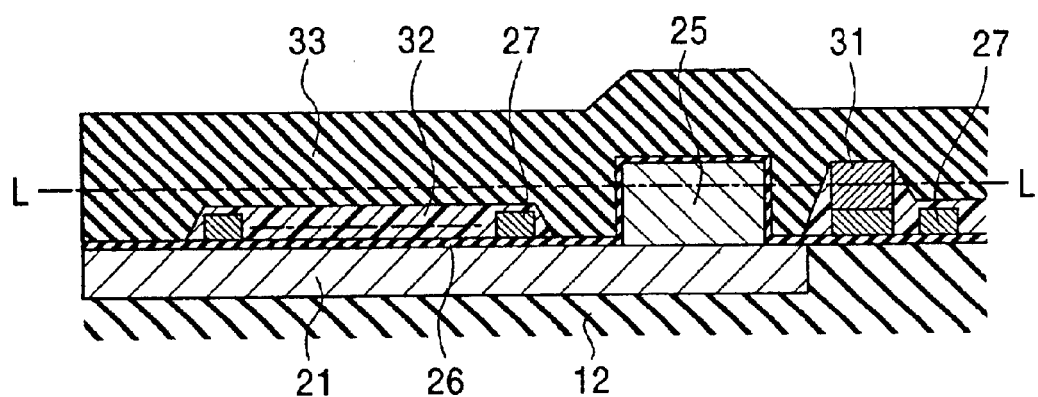
FIG. 13 is a diagram showing a step subsequent to the step shown in FIG. 12.
Figure 14:
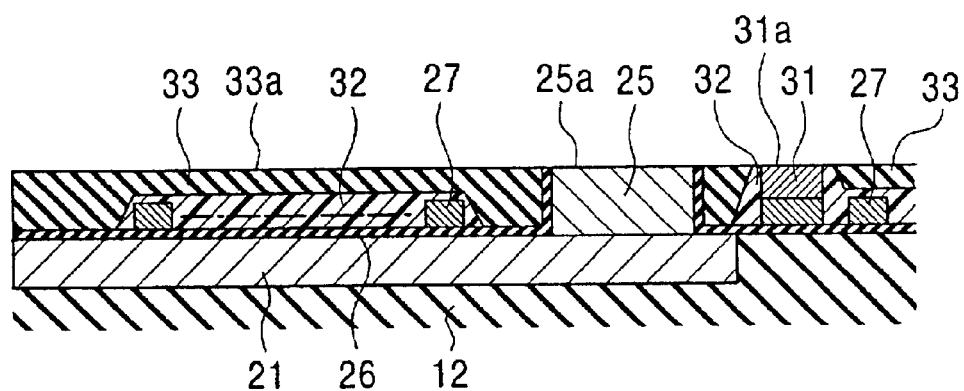
FIG. 14 is a diagram showing a step subsequent to the step shown in FIG. 13.

A method for manufacturing the perpendicular magnetic recording head according to the present invention will now be described. FIGS. 12 to 25 are diagrams showing the steps for manufacturing the perpendicular magnetic recording head of the present invention. FIGS. 12 to 14 illustrate the steps common to the perpendicular magnetic recording heads shown in FIGS. 1 to 3.

In the step shown in FIG. 12, after the formation of the auxiliary pole layer 21 composed of a magnetic material on the nonmagnetic insulating layer 12, the region behind the auxiliary pole layer 21 in the height direction is also filled with the nonmagnetic insulating layer 12. Subsequently, the surfaces of the auxiliary pole layer 21 and the nonmagnetic insulating layer 12 are planarized by CMP or the like.

Next, the connection layer 25 is formed on the rear portion of the auxiliary pole layer 21 in the height direction by plating. The insulating underlayer 26 is formed over the surfaces of the auxiliary pole layer 21, the connection layer 25, and the nonmagnetic insulating layer 12 by sputtering.

As shown in FIG. 13, the coil layer 27 is then formed on the insulating underlayer 26 by a frame plating method, and the planarizing layer 31 is formed thereon by plating. The coil layer 27 is formed sufficiently lower than the connection layer 25. The coil layer 27 and the planarizing layer 31 are coated with the insulating layer 32. An inorganic material is sputtered to form the insulating layer 33 covering all the layers.

Next, all the deposited layers shown in FIG. 13 are subjected to polishing from the top in the drawing by the CMP method or the like. Polishing is performed down to a horizontal plane (L—L plane) crossing over the insulating layer 33, the connection layer 25, and the planarizing layer 31.

After the polishing, as shown in FIG. 14, the surface 25a of the connection layer 25, the surface 33a of the insulating layer 33, and the surface 31a of the planarizing layer 31 are flush with one another.

The above described steps are common to all the embodiments. A method for manufacturing a perpendicular magnetic recording head having the structure shown in FIG. 1 will now be described.

Figure 15:
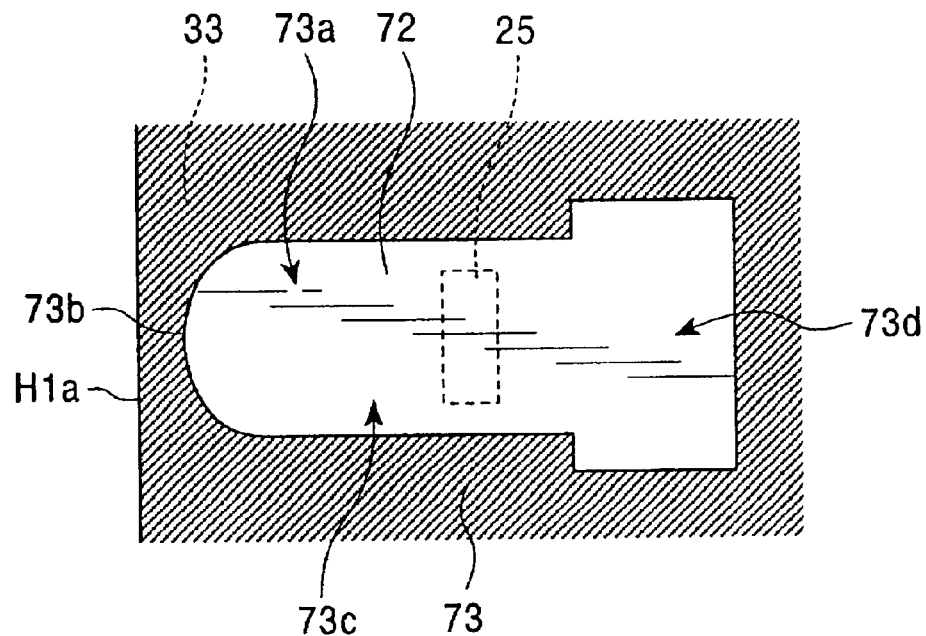
FIG. 15 is a diagram showing a step in a method of manufacturing the perpendicular magnetic recording head shown in FIG. 1.

FIG. 15 is a plan view showing the step of forming a resist layer 73 on the insulating layer 33. After the resist layer 73 is formed on the insulating layer 33, an opening 73a having the shape of the yoke layer 35 is formed by exposure and development. The opening 73a is constituted from a yoke pattern 73c in which the yoke layer 35 is formed and a common pattern 73d arranged behind the yoke pattern 73c. A front end face 73b of the opening 73a is some distance inward from the opposing face H1a as viewed in the height direction (the Y direction in the drawing). The yoke pattern 73c of the opening 73a extends up to the connection layer 25.

Next, a plating base layer 72 is deposited inside the opening 73a by sputtering and the resist layer 73 is removed.

Figure 16:
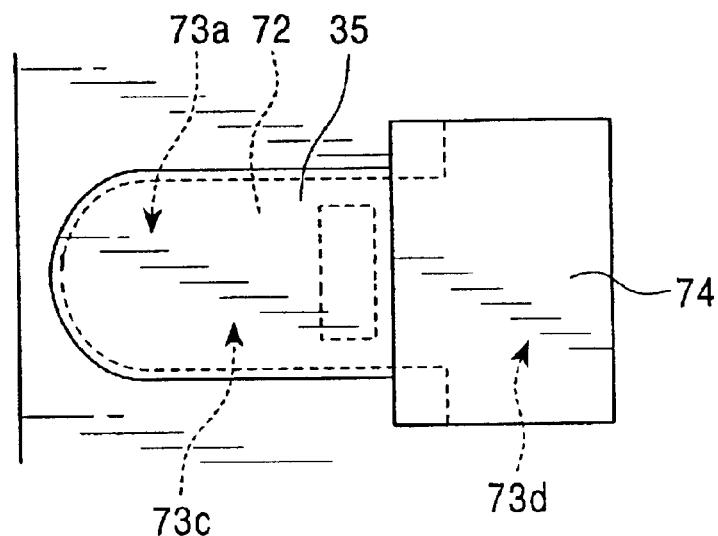
FIG. 16 is a diagram showing a step subsequent to the step shown in FIG. 15.

In the step shown in FIG. 16, a resist layer 74 is formed on the common pattern 73d, and the yoke layer 35 is grown by plating on the plating base layer 72 formed on the yoke pattern 73c not covered by the resist layer 74. Subsequently, the resist layer 74 and the plating base layer 72 on the common pattern 73d are removed. The perpendicular magnetic recording head at this stage is illustrated in a vertical cross-sectional view of FIG. 17.

Figure 17:
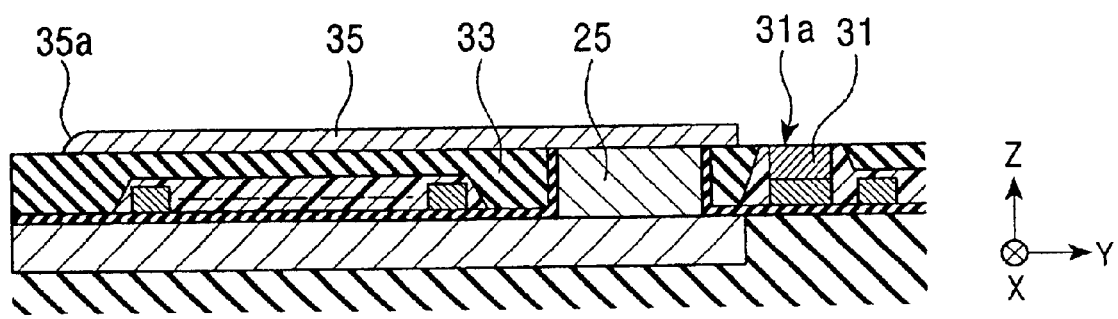
FIG. 17 is a diagram showing a step subsequent to the step shown in FIG. 16.

As shown in FIG. 17, the front end face 35a of the yoke layer 35 formed by plating on the plating base layer 72 is deformed so that the front end face 35a is flat or curved and tilts from the bottom left to the top right as viewed in the height direction (the Y direction in the drawing). The front end face 35a of the yoke layer 35 deforms because the region in front of the yoke pattern 73c is open, i.e., the region is not covered by the resist layer 74.

When the front end face 35a is flat or curved and tilts in the height direction (the Y direction in the drawing) from the bottom left to the top right, the main pole layer 24 can be easily formed in the subsequent step. Moreover, the efficiency of the flow of the magnetic flux from the yoke layer 35 to the main pole layer 24 can be improved.

Preferably, although not shown in FIG. 17, the lead layer 36 is formed by plating on the top face 31a of the planarizing layer 31 during the steps shown in FIGS. 15 and 16.

Figure 18:
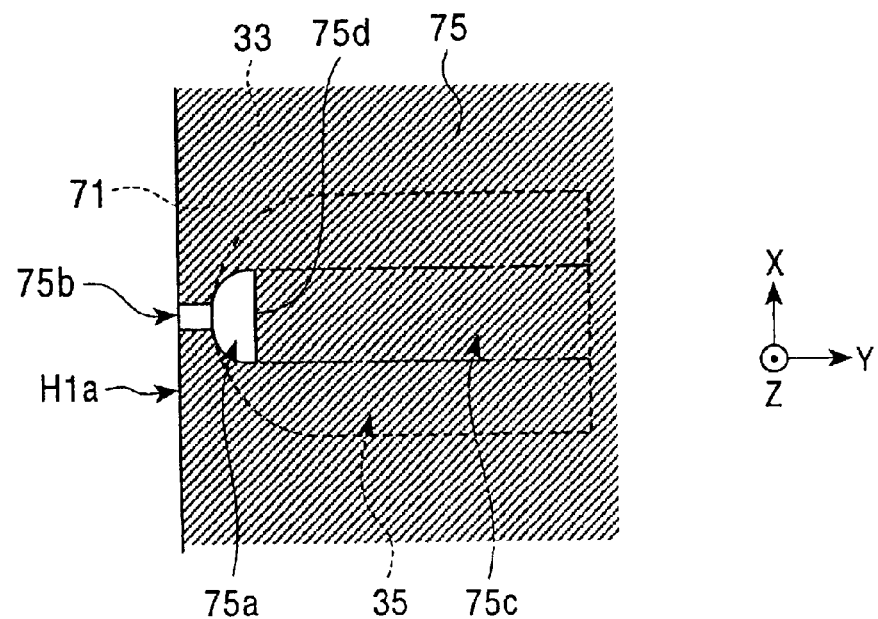
FIG. 18 is a diagram showing a step subsequent to the step shown in FIG. 17.

FIG. 18 is a plan view showing the subsequent step. In this step, the plating base layer 71 is formed over the yoke layer 35 and the insulating layer 33 surrounding the yoke layer 35 by sputtering. A resist layer 75 is then formed on the plating base layer 71, and an opening 75a for forming the main pole layer 24 is formed in the resist layer 75 by exposure and development.

As shown in FIG. 18, a front end face 75b of the opening 75a is flush with the opposing face H1a, and the opening 75a extends over the yoke layer 35. In this step, a rear end face 75d of the opening 75a may extend further in the height direction (the Y direction in the drawing) as shown by one-dot chain lines.

Figure 19:
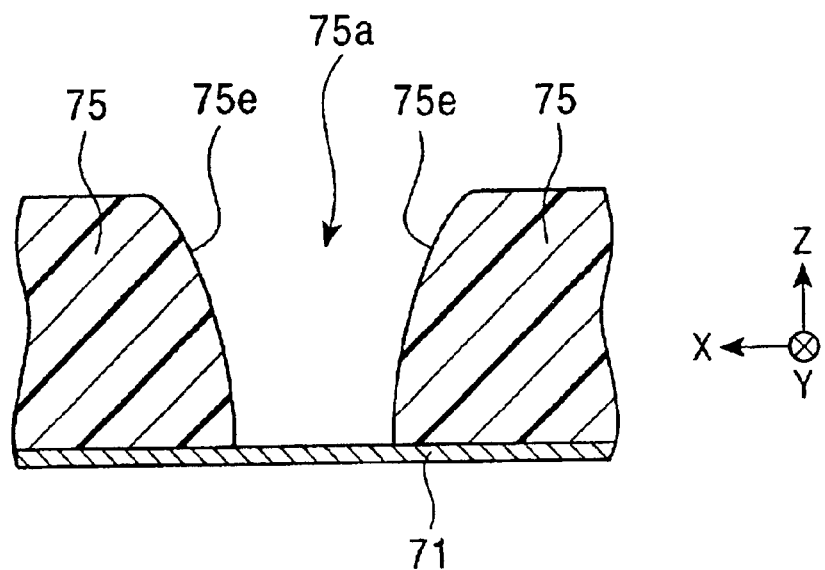
FIG. 19 is a diagram showing a step subsequent to the step shown in FIG. 18.

The resist layer 75 of this invention has the shape shown in FIG. 19 when viewed from the opposing-face-H1a side.

As shown in FIG. 19, inner side faces 75e of the opening 75a formed in the resist layer 75 are formed in such a manner that the width in the track width direction (the X direction in the drawing) gradually increases from the bottom to the top (the Z direction in the drawing). The inner side faces 75e may be curved, as shown in FIG. 19, or flat.

In order to form the opening 75a having the flat or curved inner side faces 75e in the resist layer 75, the resist layer 75 is first applied, the opening 75a is formed by exposure and development, and the inner side faces 75e of the opening 75a are deformed by annealing.

Figure 20:
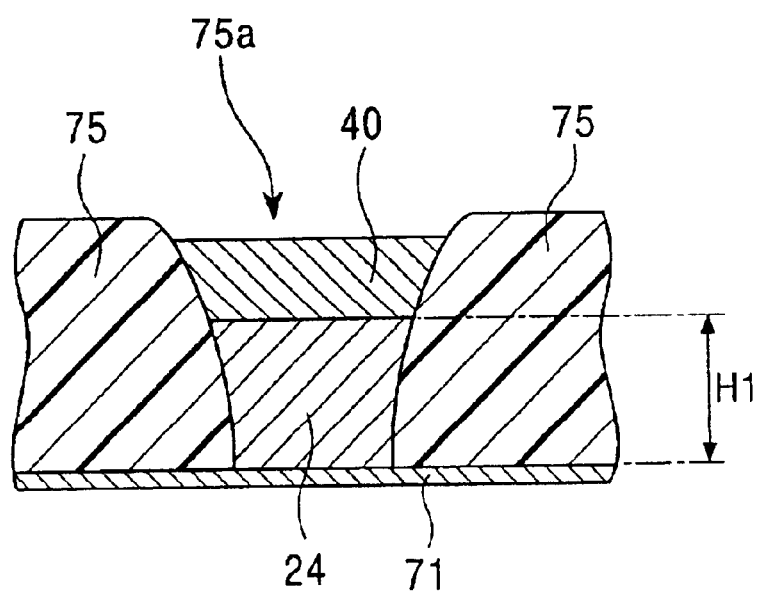
FIG. 20 is a diagram showing a step subsequent to the step shown in FIG. 19.

Next, as shown in FIG. 20, the main pole layer 24 is grown by plating on the exposed plating base layer 71 inside the opening 75a up to a predetermined layer thickness H1.

In the present invention, the nonmagnetic layer 40 composed of nonmagnetic metal material such as NiP is grown by plating on the main pole layer 24. The resist layer 75 is then removed.

The nonmagnetic layer 40 is preferably composed of a NiP alloy having a P concentration in the range of 8 percent by mass to 15 percent by mass. The nonmagnetic layer 40 composed of such an alloy can stably remain nonmagnetic against external factors such as exothermic heat. The composition of the alloy such as a NiP alloy constituting the nonmagnetic layer 40 can be determined using an X-ray diffractometer or a wavelength-dispersive X-ray diffractometer used in combination with a SEM or TEM, for example.

Figure 21:
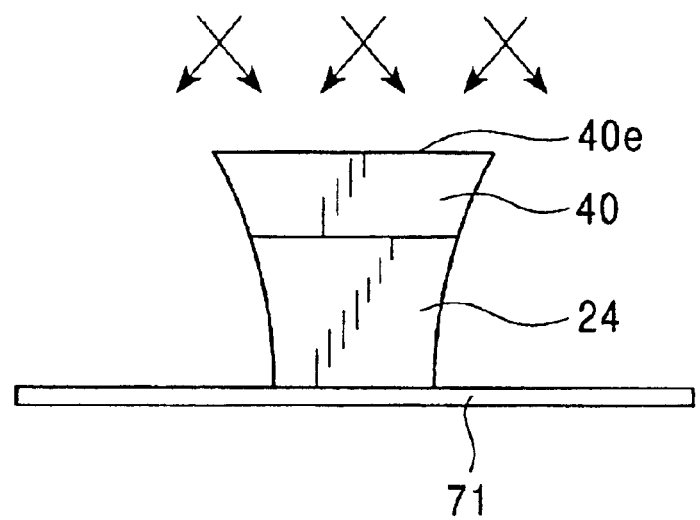
FIG. 21 is a diagram showing a step subsequent to the step shown in FIG. 20.

FIG. 21 is a diagram showing the main pole layer 24 and the nonmagnetic layer 40 after removal of the resist layer 75. As shown in FIG. 21, the main pole layer 24 and the nonmagnetic layer 40 having the width in the track width direction gradually increasing toward the top are deposited on the plating base layer 71. Two side faces of these layers may be flat or curved as shown in FIG. 21.

As shown in FIG. 21, since the plating base layer 71 is formed not only in the region overlaid by the main pole layer 24 but also in the regions other than the overlaid region, the plating base layer 71 in these regions needs to be removed.

In the step shown in FIG. 21, the plating base layer 71 in the regions other than the region overlaid by the main pole layer 24 is removed by anisotropic ion milling. During this step, the top face 40e of the nonmagnetic layer 40 is also milled.

Figure 22:
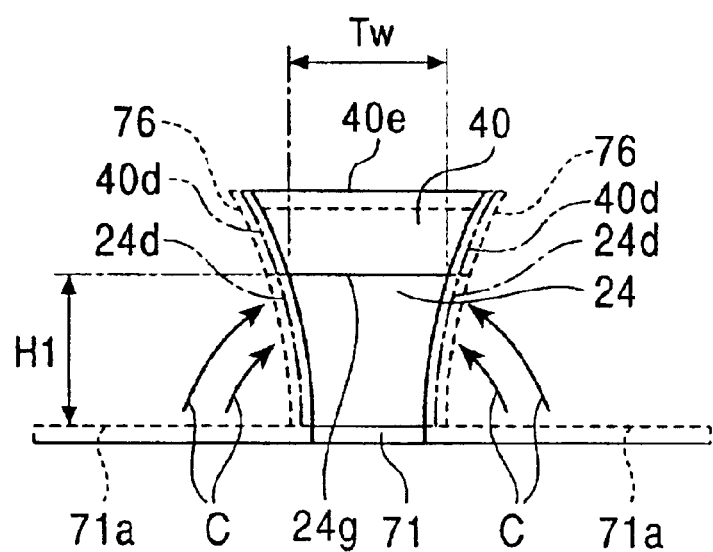
FIG. 22 is a diagram showing a step subsequent to the step shown in FIG. 21.

Referring to FIG. 22, a portion 71a of the plating base layer 71 removed by milling adheres to the two side faces 24d and 40d of the main pole layer 24 and the nonmagnetic layer 40, respectively, as indicated by arrows C, to form adhered layers 76. These adhered layers 76 are removed by anisotropic ion milling. The top face 40e of the nonmagnetic layer 40 is further milled during this step.

As described above, since the nonmagnetic layer 40 is provided on the main pole layer 24 in the present invention, the height H1 of the main pole layer 24 is not affected by ion milling.

As shown by a one-dot chain line in FIG. 22, the height H1 of the main pole layer 24 does not decrease even when the track width Tw defined by the top face 24g (the trailing end face) of the main pole layer 24 is reduced by further milling the two side faces 24d and 40d of the main pole layer 24 and the nonmagnetic layer 40, respectively.

According to the manufacturing method of the present invention, the portion 71a and the adhered layers 76 can be removed and the track width can be reduced while maintaining the height H1 of the main pole layer 24 at a predetermined height.

In the present invention, ion milling is preferably performed at an angle in the range of 45° to 70° relative to the normal of the plating base layer 71.

At a milling angle in the range of 45° to 60°, the removal of the adhered layers 76 and reduction of the track width can be completed in a single ion milling step, thereby simplifying the manufacturing process.

In a case where milling of only the two side faces 24d of the main pole layer 24 is desired, the milling angle should be in the range of 60° to 70° relative to the normal of the plating base layer 71.

In the present invention, the height H1 of the main pole layer 24 is preferably in the range of 0.25 μm to 0.5 μm. In this invention, the height H1 can be controlled during the step of growing the main pole layer 24 by plating shown in FIG. 20.

In the present invention, the track width Tw of the main pole layer 24 is preferably 0.7 μm or less, and, more preferably, 0.5 μm or less. If the width of the opening 75a formed in the resist layer 75 shown in FIG. 20 can be made substantially as small as the predetermined track width Tw, the track width Tw of the main pole layer 24 can be defined during the step of growing the main pole layer 24 by plating. If the width of the opening 75a cannot be made substantially as small as the predetermined track width Tw, the two side faces 24d of the main pole layer 24 need to be milled during the step of ion milling shown in FIG. 22 to set the track width Tw at a predetermined width. Note that even when the track width Tw is defined during the step of growing the main pole layer 24 in the opening 75a of the resist layer 75 by plating, the milling step is still necessary in order to remove the portion 71a of the underlayer 71 and the adhered layers 76 disposed on the two side faces 24d.

Accordingly, in the present invention, the height Hi of the main pole layer 24 and the track width Tw can be independently controlled and easily adjusted.

The plating base layer 71 for plating may be composed of a magnetic plating material or a nonmagnetic plating material. When a nonmagnetic metal material such as copper is used as the material of the plating base layer 71, the plating base layer 71 may slightly extend beyond the region under the main pole layer 24 and thus beyond the recorded track width Tw1 recorded in the recording medium when a skew angle is generated during recording. Thus, compared to the case where a magnetic plating material is used, the use of nonmagnetic plating materials in the plating base layer 71 will facilitate etching control.

With the plating base layer 71 composed of nonmagnetic plating material, the adhered layers 76 provided on the two side faces of the main pole layer 24 need not be removed because the track width Tw remains the same even with the adhered layers 76. However, the two side faces 24d of the main pole layer 24 may be milled to make a perpendicular magnetic recording head suitable for narrower track width.

Figure 23:
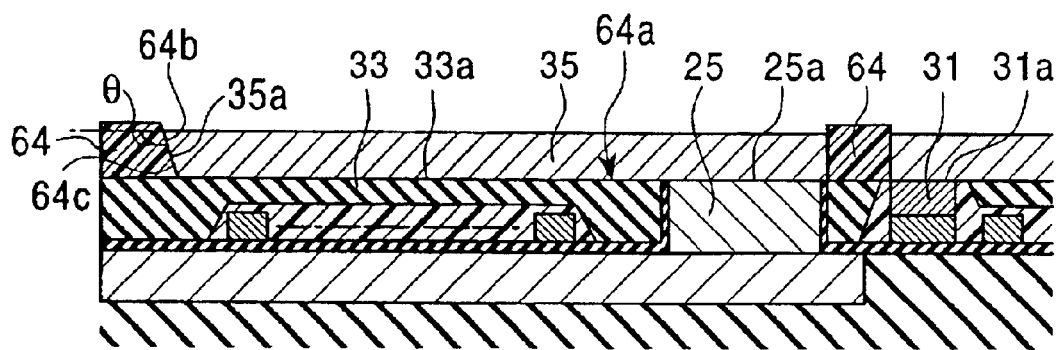
FIG. 23 is a diagram showing a step in a method of manufacturing the perpendicular magnetic recording head shown in FIG. 2 subsequent to the step shown in FIG. 14.
Figure 24:
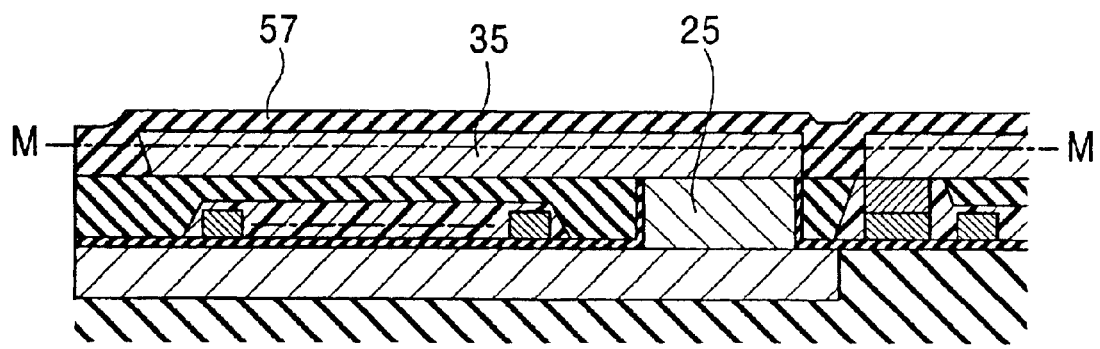
FIG. 24 is a diagram showing a step subsequent to the step shown in FIG. 23.
Figure 25:
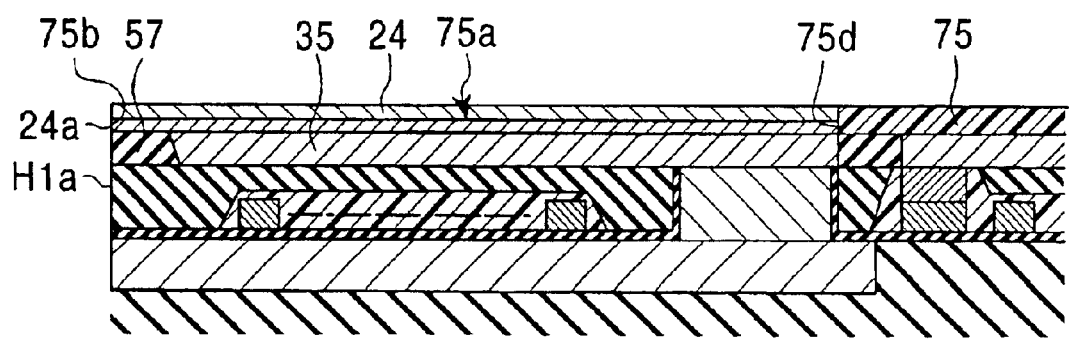
FIG. 25 is a diagram showing a step subsequent to the step shown in FIG. 25.

FIGS. 23 to 25 are diagrams illustrating the steps for making the perpendicular magnetic recording head shown in FIG. 2.

In the step shown in FIG. 23, a resist layer 64 is formed overlaying the top face 33a of the insulating layer 33, the top face 25a of the connection layer 25, and the top face 31a of the planarizing layer 31. An opening 64a for the yoke layer 35 is then formed by exposure and development.

As shown in FIG. 23, a front end face 64b of the opening 64a is formed some distance inward in the height direction from the opposing face H1a. A portion of the resist layer 64 between the front end face 64b and the opposing face H1a has a rear end face 64c tilting toward the opposing face H1a from the bottom right to the top left in the drawing. The rear end face 64c can be formed into such a shape by annealing and deforming the resist layer 64. The opening 64a extends over the connection layer 25.

The yoke layer 35 is formed in the opening 64a by plating, and the resist layer 64 is then removed. The yoke layer 35 having the front end face 35a positioned inward in the height direction from the opposing face H1a is formed thereby. The front end face 35a is preferably a flat or curved face tilting in the height direction from the bottom right to the top left in the drawing. The external angle θ defined by the front end face 35a and the top face is preferably 90° or more. The yoke layer 35 is magnetically coupled to the connection layer 25.

After the removal of the resist layer 64, plating base layers not shown in the drawing formed in the region other than the region overlaid by the yoke layer 35 are etched away.

In the step shown in FIG. 24, the second insulating layer 57 composed of an inorganic insulative material is formed over the yoke layer 35 and the insulating layer 33. The second insulating layer 57 is subjected to CMP planarization down to line M—M shown in FIG. 24 so that the top face of the second insulating layer 57 is flush with the top face of the yoke layer 35.

Next, in the step shown in FIG. 25, the main pole layer 24 and the nonmagnetic layer 40 are formed by plating in a manner similar to that shown in FIGS. 18 to 20. As shown in FIG. 25, the resist layer 75 is formed over the second insulating layer 57 and the yoke layer 35, and the opening 75a for the main pole layer 24 is formed in the resist layer 75. Since the top faces of the second insulating layer 57 and the yoke layer 35 both disposed under the resist layer 75 are planarized, the opening 75a can be formed with high precision.

As show in FIG. 25, the thickness of the resist layer 75 is smaller than the thickness of the resist layer 64 in the step shown in FIG. 23, and the front end face 75b of the opening 75a of the resist layer 75 is flush with the opposing face H1a. The rear end face 75d of the opening 75a is in contact with the rear end face of the yoke layer 35 to be flush with the yoke layer 35, as shown in FIG. 25. Alternatively, the rear end face 75d of the opening 75a may be positioned closer to the opposing face H1a.

Next, the main pole layer 24 is formed by plating in the opening 75a, the nonmagnetic layer 40 is formed by plating on the main pole layer 24, and the resist layer 75 is removed. The front end face 24a is exposed at the opposing face H1a, and the main pole layer 24, which is thinner than the yoke layer 35, is formed on the yoke layer 35.

Next, as in FIGS. 21 and 22, the portion 71a is removed, the adhered layers 76 are removed, and the two side faces 24d of the main pole layer 24 are milled to reduce the track width, all by ion milling.

The perpendicular magnetic recording head shown in FIG. 3 can be manufactured through the steps shown in FIGS. 12 to 14 and the steps shown in FIGS. 23 to 25.

In the present invention, the width in the track width direction (the X direction in the drawing) of the resist layer 75 shown in FIG. 19 may not gradually increase from the bottom to the top. The advantages of the present invention can still be achieved using the front end face 24a of the main pole layer 24 having the conventional shape of a square or a rectangle.

Furthermore, although the reading regions $H_R$ are formed in the embodiments shown in FIGS. 1 and 2, the reading region $H_R$ may not always be formed.

As described above, in the present invention, a nonmagnetic layer is superimposed on a main pole layer. Since the nonmagnetic layer functions as a protective layer for the main pole layer during milling, the layers adhering to the two side faces of the main pole layer during milling of the undesired portion of the plating base layer can be suitably removed and the track width Tw of the main pole layer can be reduced without affecting the height of the main pole layer. Thus, the width in the track width direction and the height of the main pole layer can be independently controlled.

Accordingly, the front end face of the main pole layer having a predetermined track width Tw and height can be manufactured. The area of the front end face can be readily adjusted within a predetermined range, and various characteristics such as overwrite characteristics can be improved.

What is claimed is:

1. A perpendicular magnetic recording head comprising: an auxiliary pole layer; a main pole layer; and a coil layer for providing a recording magnetic field to the auxiliary pole layer and the main pole layer, a front end face of the auxiliary pole layer and a front end face of the main pole layer being exposed at an opposing face of the perpendicular magnetic recording head opposing a recording medium, the front end faces being separated by a gap therebetween, the coil layer being located inward from the opposing face, the perpendicular magnetic recording head writing magnetic data on the recording medium by a perpendicular magnetic field concentrated to the main pole layer, wherein the perpendicular magnetic recording head further comprises a nonmagnetic layer formed on the main pole layer and a connection layer extending from the auxiliary pole layer and being magnetically connected with the main pole layer, the connection layer being located inward from the opposing face, the coil layer surrounding the connection layer.

2. A perpendicular magnetic recording head according to claim 1, further comprising a yoke layer for magnetically connecting the main pole layer to the connection layer.

3. A perpendicular magnetic recording head according to claim 2, wherein the saturation magnetic flux density of the main pole layer is higher than the saturation magnetic flux density of the yoke layer.

4. A perpendicular magnetic recording head according to claim 2, further comprising an insulating layer embedding the coil layer, the insulating layer being disposed on the auxiliary pole layer and having the top face flush with the top face of the main pole layer, wherein the yoke layer is formed on the top face of the insulating layer and the top face of the connection layer and has a front end face located inward in the height direction from the opposing face, and wherein the main pole layer and the nonmagnetic layer extend from the top face of the insulating layer to the top face of the yoke layer, the nonmagnetic layer being disposed between the front end face of the yoke layer and the opposing face.

5. A perpendicular magnetic recording head according to claim 4, wherein the front end face of the yoke layer tilts in the height direction toward the top of the yoke layer and is either flat or curved.

6. A perpendicular magnetic recording head according to claim 4, wherein the area of the yoke layer is larger than the area of the main pole layer in a cross section taken at an overlapping region of the yoke layer and the main pole layer and in the direction parallel to the opposing face.

7. A perpendicular magnetic recording head according to claim 2, further comprising:

a first insulating layer embedding the coil layer, the top of face of the first insulating layer being flush with the top face of the connection layer, the yoke layer being formed on the top faces of the first insulating layer and the connection layer, a front end face of the yoke layer being disposed inward in the height direction from the opposing face; and a second insulating layer disposed between the front end face of the yoke layer and the opposing face, the top face of the second insulating layer being flush with the top face of the yoke layer, wherein the main pole layer and the nonmagnetic layer extend from the top face of the second insulating layer to the top face of the yoke layer.

8. A perpendicular magnetic recording head according to claim 7, wherein the front end face of the yoke layer tilts in the height direction toward the bottom of the yoke layer and is either flat or curved.

9. A perpendicular magnetic recording head according to claim 7, wherein the area of the yoke layer is larger than the area of the main pole layer in a cross section taken at an overlapping region of the yoke layer and the main pole layer and in the direction parallel to the opposing face.

10. A perpendicular magnetic recording head according to claim 1, wherein the nonmagnetic layer comprises a nonmagnetic metal material.

11. A perpendicular magnetic recording head according to claim 10, wherein the main pole layer and the nonmagnetic layer are formed by plating.

12. A perpendicular magnetic recording head according to claim 1, wherein the front end face of the main pole layer exposed at the opposing face has a width in the track width direction gradually increasing toward the top of the main pole layer.

13. A perpendicular magnetic recording head according to claim 12, wherein two sides of the front end face of the main pole in the track width direction are tilted away from each other toward the top of the main pole layer, and have one of a straight or curved shape.

14. A perpendicular magnetic recording head according to claim 12, further comprising a plating base layer comprising a magnetic material, wherein the main pole layer is disposed on the plating base layer, at least part of each of two side faces of the plating base layer in the track width direction is extended beyond an end of the bottom face of the main pole layer in the track width direction, and the extended part is controlled to a predetermined width so that the extended part does not protrude from the recorded track width Tw1 of the recording medium when a skew angle is generated during recording on the recording medium.

15. A perpendicular magnetic recording head according to claim 1, further comprising a plating base layer comprising a magnetic material, wherein the main pole layer is disposed on the plating base layer, two side faces of the plating base layer in the track width direction and two side faces in the track width direction of the main pole layer are on a continuous plane, the width in the track width direction of the top face of the plating base layer being equal to that of the bottom face of the main pole layer; and the width in the track width direction of the plating base layer either decreases or is maintained the same as the width of the bottom face of the main pole layer toward the bottom face of the plating base layer.

16. A perpendicular magnetic recording head according to claim 1, further comprising a plating base layer comprising a nonmagnetic metal material, wherein the main pole layer is formed on the plating base layer.

17. A perpendicular magnetic recording head according to claim 16, wherein the width in the track width direction of the plating base layer is larger than the width in the track width direction of the bottom face of the main pole layer.

* * * * *